US012262192B2

(12) United States Patent
Itakura et al.

(10) Patent No.: US 12,262,192 B2
(45) Date of Patent: Mar. 25, 2025

(54) INFORMATION PROCESSING DEVICE, INFORMATION PROCESSING METHOD, PROGRAM, AND INFORMATION PROCESSING SYSTEM

(71) Applicant: Sony Corporation, Tokyo (JP)

(72) Inventors: Eisaburo Itakura, Tokyo (JP); Takeshi Yamaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 17/277,610

(22) PCT Filed: Sep. 12, 2019

(86) PCT No.: PCT/JP2019/035845
§ 371 (c)(1),
(2) Date: Mar. 18, 2021

(87) PCT Pub. No.: WO2020/066649
PCT Pub. Date: Apr. 2, 2020

(65) Prior Publication Data
US 2021/0352427 A1 Nov. 11, 2021

(30) Foreign Application Priority Data
Sep. 26, 2018 (JP) ................. 2018-179846

(51) Int. Cl.
H04S 7/00 (2006.01)
G10L 15/00 (2013.01)
G10L 15/24 (2013.01)

(52) U.S. Cl.
CPC ............ H04S 7/303 (2013.01); G10L 15/005 (2013.01); G10L 15/24 (2013.01); H04S 2400/11 (2013.01); H04S 2420/01 (2013.01)

(58) Field of Classification Search
CPC .. H04S 7/303; H04S 2400/11; H04S 2420/01; H04S 2420/13; G10L 15/005; G10L 15/24
See application file for complete search history.

(56) References Cited

U.S. PATENT DOCUMENTS

| 9,875,719 B2 * | 1/2018 | Eckhoff | G09G 5/00 |
| 10,484,809 B1 * | 11/2019 | Moore | H04R 5/02 |
| 11,132,812 B2 * | 9/2021 | Saito | G06T 7/20 |

(Continued)

FOREIGN PATENT DOCUMENTS

| JP | H04170299 A | 6/1992 |
| JP | H04351197 A | 12/1992 |

(Continued)

OTHER PUBLICATIONS

International Search Report issued Nov. 19, 2019 in PCT/JP2019/035845 filed Sep. 12, 2019.

Primary Examiner — Jason R Kurr
(74) Attorney, Agent, or Firm — Oblon, McClelland, Maier & Neustadt, L.L.P.

(57) ABSTRACT

An information processing device includes circuitry that estimates an attribute of a first person located in at least one of a plurality of areas, and sets a first content corresponding to the attribute of the first person and outputs a sound through wave field synthesis so that a sound field of the set first content is spatially transmitted to at least the one of the plurality of areas via a plurality of speakers.

26 Claims, 26 Drawing Sheets

(56) References Cited

U.S. PATENT DOCUMENTS

| | | | |
|---|---|---|---|
| 2006/0098830 A1* | 5/2006 | Roeder | H04S 3/002 381/310 |
| 2007/0271580 A1 | 11/2007 | Tischer et al. | |
| 2008/0025534 A1* | 1/2008 | Kuhn | H04S 7/30 381/300 |
| 2010/0027832 A1* | 2/2010 | Koseki | H04R 1/323 381/387 |
| 2013/0219417 A1* | 8/2013 | Gilson | H04N 21/44218 725/12 |
| 2014/0153753 A1* | 6/2014 | Crockett | H04S 7/303 381/307 |
| 2016/0014540 A1* | 1/2016 | Kelly | H04S 7/303 381/303 |
| 2017/0295446 A1* | 10/2017 | Thagadur Shivappa | G06F 3/16 |
| 2019/0327573 A1 | 10/2019 | Maeno et al. | |
| 2019/0370865 A1* | 12/2019 | Shyu | G06Q 30/0276 |

FOREIGN PATENT DOCUMENTS

| | | |
|---|---|---|
| JP | 2005-295181 A | 10/2005 |
| JP | 2010039094 A | 2/2010 |
| JP | 2012-175162 A | 9/2012 |
| JP | 2012-253707 A | 12/2012 |
| JP | 2014093698 A | 5/2014 |
| JP | 2016177394 A | 10/2016 |
| JP | 2017123505 A | 7/2017 |
| JP | 2018055248 A | 4/2018 |
| JP | 2018072617 A | 5/2018 |
| WO | WO-2013168254 A1 | 11/2013 |
| WO | WO 2018/008395 A1 | 1/2018 |

* cited by examiner

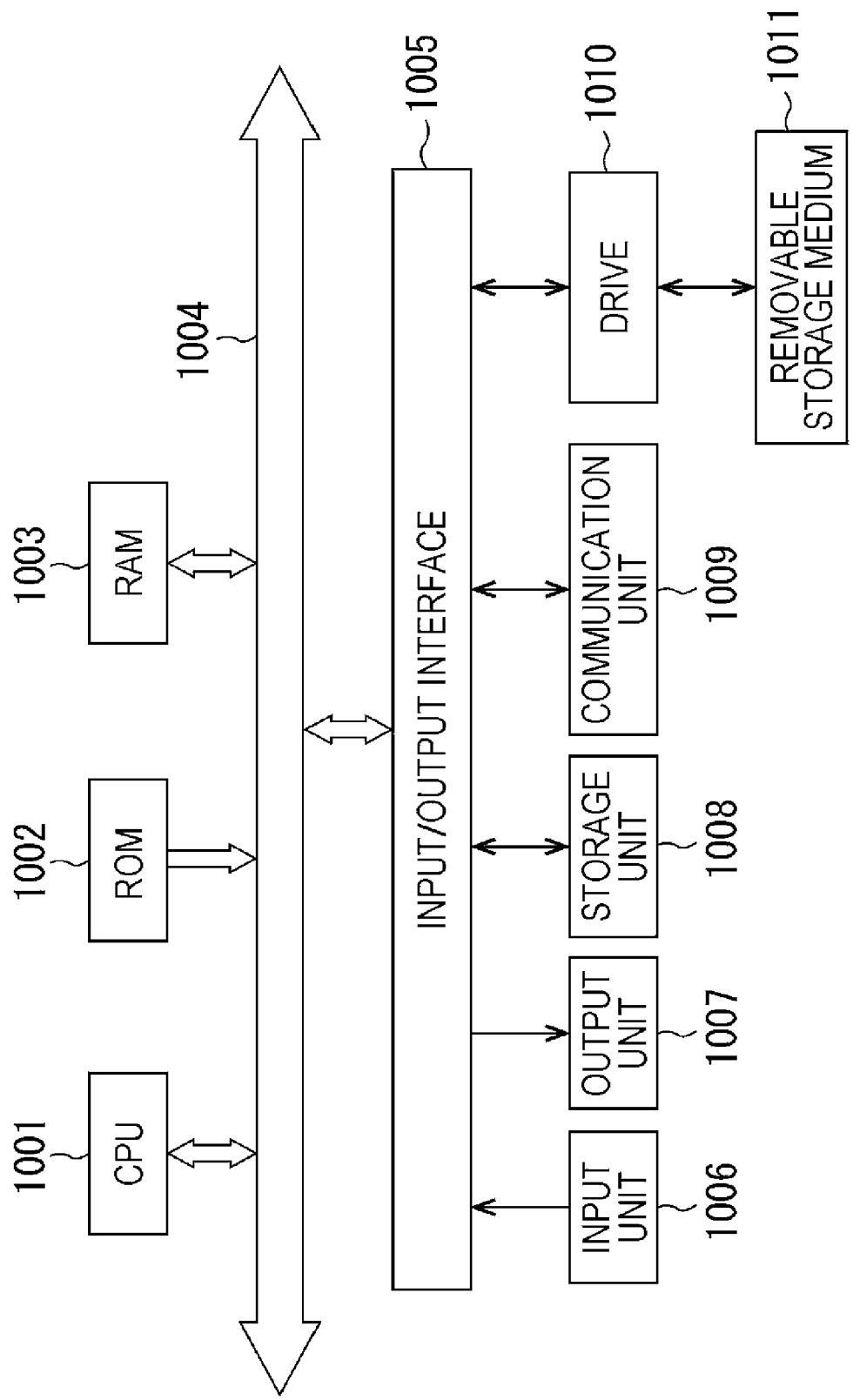

INFORMATION PROCESSING DEVICE, INFORMATION PROCESSING METHOD, PROGRAM, AND INFORMATION PROCESSING SYSTEM

TECHNICAL FIELD

The present disclosure relates to an information processing device, an information processing method, a program, and an information processing system, and more particularly, to an information processing device, an information processing method, a program, and an information processing system which are capable of enabling a plurality of listeners to hear an appropriate sound at the same time in accordance with motions of a plurality of listeners.

CROSS REFERENCE TO RELATED APPLICATIONS

This application claims the benefit of Japanese Priority Patent Application JP 2018-179846 filed on Sep. 26, 2018, the entire contents of which are incorporated herein by reference.

BACKGROUND ART

Techniques of following a motion of a listener and enabling an appropriate sound to be heard at a position at which the listener is located have been proposed (see PTLs 1 to 3).

CITATION LIST

Patent Literature

PTL 1: JP 2005-295181A
PTL 2: JP 2012-175162A
PTL 3: JP 2012-253707A

SUMMARY OF INVENTION

Technical Problem

However, in the techniques disclosed in PTLs 1 to 3, it is possible to follow a motion of a specific listener and enable the specific listener to heard a sound appropriately, but a technique of enabling a plurality of listeners to hear an appropriate sound at the same time in accordance with motions of a plurality of listeners is not disclosed.

The present disclosure was made in light of the foregoing, and proposes, in particular, a technique of enabling a plurality of listeners to hear an appropriate sound at the same time in accordance with motions of a plurality of listeners.

Solution to Problem

An information processing device, a program, and an information processing system according to one aspect of the present disclosure are an information processing device, a program, and an information processing system including an attribute estimating unit that estimates an attribute of a person and an audio output unit that sets content corresponding to the attribute of the person estimated by the attribute estimating unit and outputs a sound through wave field synthesis so that a sound field of the set content is spatially transmitted.

An information processing method according to one aspect of the present disclosure corresponds to the information processing device.

An information processing device according to an aspect of the present disclosure includes circuitry that estimates an attribute of a first person located in at least one of a plurality of areas, and sets a first content corresponding to the attribute of the first person and outputs a sound through wave field synthesis so that a sound field of the set first content is spatially transmitted to at least the one of the plurality of areas via a plurality of speakers.

An information processing method according to an aspect of the present disclosure includes estimating, with circuitry, an attribute of a first person located in at least one of a plurality of areas; setting, with the circuitry, a first content corresponding to the attribute of the first person; and outputting a sound through wave field synthesis so that a sound field of the set first content is spatially transmitted to at least the one of the plurality of areas via a plurality of speakers.

A non-transitory computer-readable medium encoded with computer-readable instructions that, when executed by a computer, cause the computer to perform a method comprising: estimating an attribute of a first person located in at least one of a plurality of areas; setting a first content corresponding to the attribute of the first person; and outputting a sound through wave field synthesis so that a sound field of the set first content is spatially transmitted to at least the one of the plurality of areas via a plurality of speakers.

An information processing system, comprising circuitry that estimates an attribute of a first person located in at least one of a plurality of areas, sets a first content corresponding to the attribute of the first person, and outputs a sound through wave field synthesis so that a sound field of the set first content is spatially transmitted to at least the one of the plurality of areas via a plurality of speakers.

Advantageous Effects of Invention

In one aspect of the present disclosure, an attribute of a person is estimated, content corresponding to the estimated attribute of the person is set, and a sound is output through wave field synthesis so that a sound field of the set content is spatially transmitted.

BRIEF DESCRIPTION OF DRAWINGS

FIG. 26 is a diagram illustrating a configuration example of a general-purpose personal computer.

DESCRIPTION OF EMBODIMENTS

Figure 1:
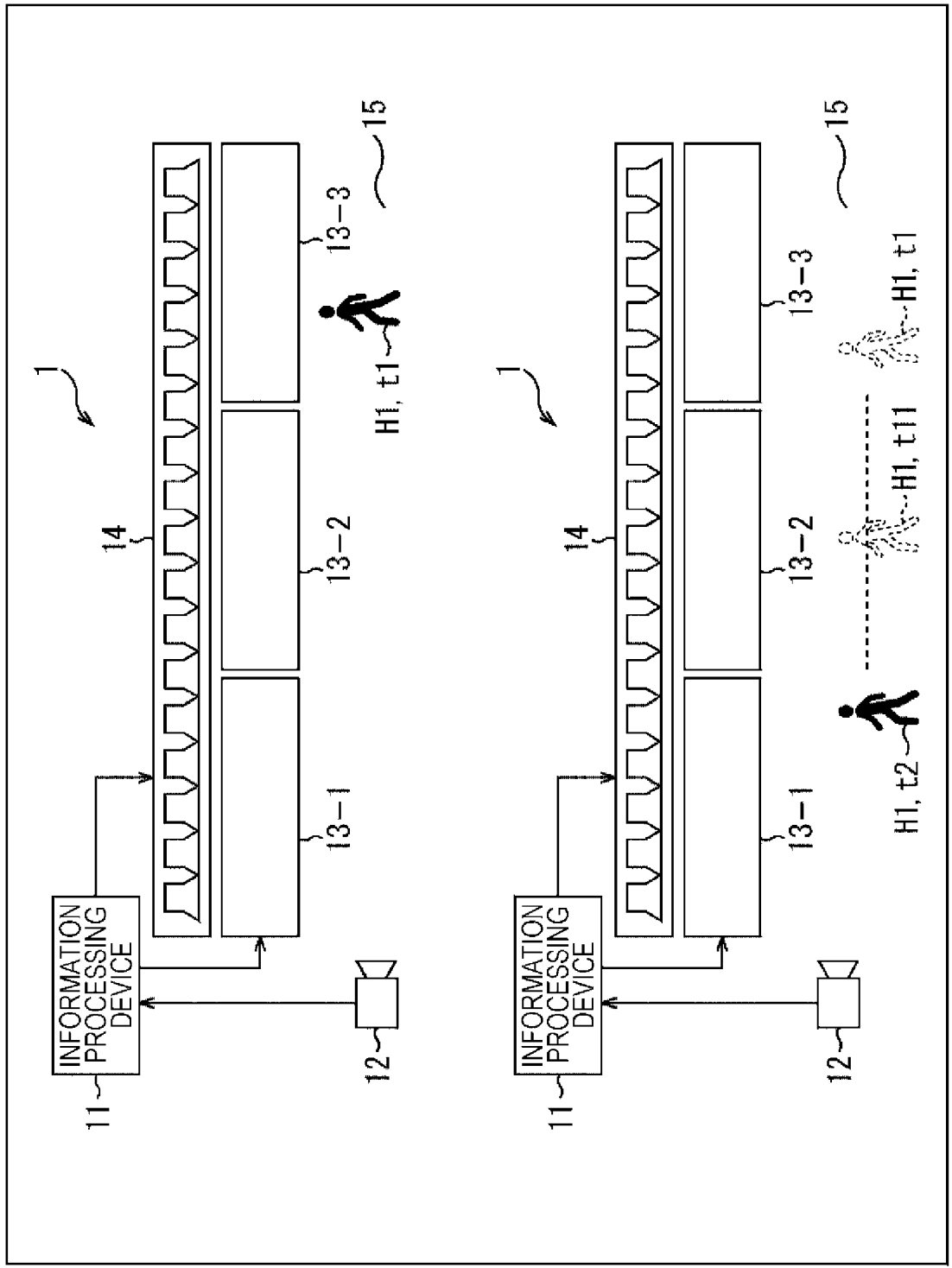
FIG. 1 is a diagram illustrating an overview of an advertisement presentation system of an embodiment of the present disclosure.

Hereinafter, exemplary embodiments of the present disclosure will be described with reference to the appended drawings.

Note that, in this specification and the appended drawings, structural elements that have substantially the same function and structure are denoted with the same reference numerals, and repeated explanation of these structural elements is omitted.

Hereinafter, a mode for carrying out the present technology will be described. The description will proceed in the following order.

1. First embodiment
2. Second embodiment
3. Third embodiment
4. Fourth embodiment
5. Modified example
6. Fifth embodiment
7. Sixth embodiment
8. Example executed by software 1. First Embodiment <Overview of the Present Disclosure>

An overview of an advertisement presentation system of an embodiment of the present disclosure will be described with reference to FIG. 1.

An advertisement presentation system 1 of FIG. 1 is a system which is also referred to as a digital signage and presents an advertisement constituted by an image and a sound to a pedestrian walking on a passage or the like.

As illustrated in FIG. 1, the advertisement presentation system 1 includes an information processing device 11, a sensor 12, display units 13-1 to 13-3, and a multi-speaker system 14, and the display units 13-1 to 13-3 and the multi-speaker system 14 are installed along a passage 15. Further, in a case where it is unnecessary to specify each of the display units 13-1 to 13-3, it is referred to simply as a display unit 13, and other configurations are similarly referred to.

The sensor 12 detects a position of a pedestrian who walks on the passage and is a listener who listens to (views) an advertisement and outputs the detected position of the pedestrian to the information processing device 11. The sensor 12 is, for example, a camera that images the passage, and captures an image of the position of the pedestrian on the passage and outputs the captured image to the information processing device 11 as a detection result. Further, the sensor 12 may be a sensor other than a camera as long as it is a sensor for detecting the position of the pedestrian located on the passage, and, for example, an area light-shielded with walking of the pedestrian may be detected as the position of the pedestrian through a sensor that detects a position on the basis of a weight associated with the passage of the pedestrian or a sensor including a light projecting unit that projects a laser beam onto the passage and a light receiving unit. Here, the following description will proceed under the assumption that the sensor 12 captures an image of the passage 15 and outputs the captured image to the information processing device 11.

The information processing device 11 detects a position, a moving speed, and a moving direction of the pedestrian in the passage on the basis of the image captured by the sensor 12, estimates a motion of the pedestrian in the future of a predetermined time, causes an advertisement sound which the pedestrian can hear as an appropriate sound to be output from the multi-speaker system 14 at an estimated position estimated at a predetermined timing in the future of a predetermined time, and causes an advertisement image to be displayed in the display unit 13 closest to an estimated position.

The display units 13-1 to 13-3 are displays constituted by a liquid crystal display (LCD) or an organic electro luminescence (EL) and are installed along the passage 15 on which the pedestrian walks. Further, in FIG. 1, the example in which the three display units 13-1 to 13-3 are installed as the display unit 13 is illustrated, but the number of display units 13 may not be three. Further, the number of display units 13 may be one, and the advertisement image may be displayed in an area on the display unit 13 closest to the estimated position at a predetermined timing.

The multi-speaker system 14 is constituted by a plurality of speakers, and causes a sound to be output as if there are sound sources at various positions including before and after a surface on which a speaker is installed through wave field synthesis using each speaker. Here, the wave field synthesis is a process of adjusting a sound output from a plurality of speakers, forming a spatial sound field by changing a position of a virtual sound source of a sound variously, and transmitting the spatial sound field.

Figure 2:
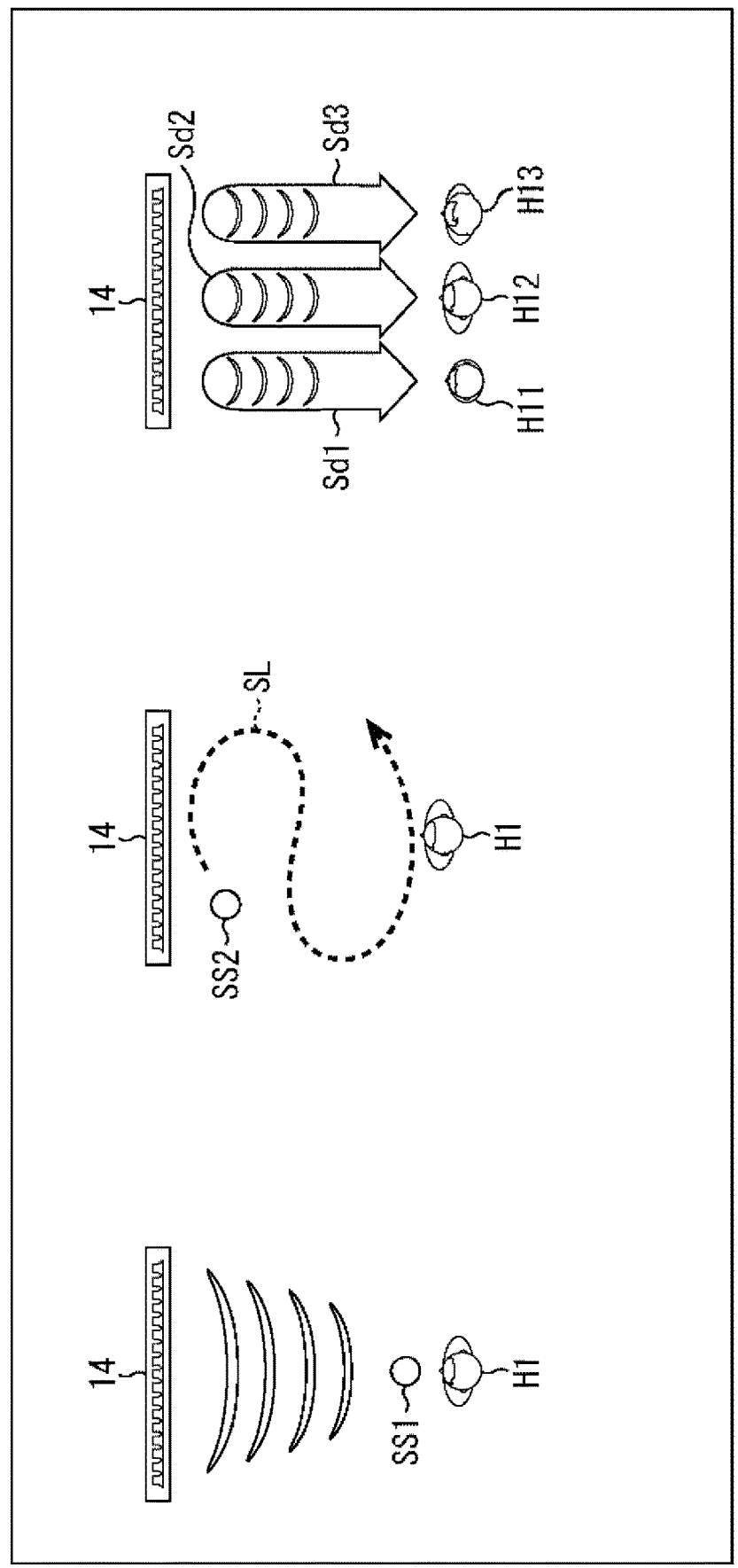
FIG. 2 is a diagram for describing a sound example realized by wave field synthesis.

As illustrated in a left portion of FIG. 2, in a case where a listener H1 hears a sound output from the multi-speaker system 14 through wave field synthesis, for example, the multi-speaker system 14 can output a sound to be heard as if a sound source SS1 is located at a position in front of a speaker surface of the multi-speaker system 14 through the wave field synthesis.

Further, as illustrated in a middle portion of FIG. 2, in a case where the listener H1 hears the sound output from the multi-speaker system 14 through wave field synthesis, for example, the multi-speaker system 14 can output a sound to be hard as if a sound source SS2 moves while drawing an S-shaped path SL ahead of or behind the speaker surface of the multi-speaker system 14 through the wave field synthesis.

Further, as illustrated in a right portion of FIG. 2, in a case where the listener H1 hears the sound output from the multi-speaker system 14 through wave field synthesis, for example, the multi-speaker system 14 can output a sound in which individual sounds Sd1 to Sd3 are heard by listeners H11 to H13 without being mixed when the listeners H11 to H13 are lined up to face the speaker surface in front of the speaker surface of the multi-speaker system 14 through the wave field synthesis.

Further, although not illustrated, the multi-speaker system 14 can also output a sound as if there is a sound source at a position behind the speaker surface of the multi-speaker system 14.

In other words, if a position of the pedestrian who is the listener within a space can be specified, the multi-speaker system 14 can cause an advertisement sound to which any one of three types of effects described above with reference to FIG. 2 or an effect of a combination thereof is added to be heard through the wave field synthesis. Further, a "sound" includes a sound other than a human voice such as a music or a sound effect.

Next, an overview of an operation of the advertisement presentation system 1 will be described with reference to FIG. 1.

As illustrated in an upper portion of FIG. 1, the information processing device 11 detects a position, a moving speed, and a moving direction of the pedestrian H1 at a time t1 on the basis of the image captured by the sensor 12. Then, as illustrated in a lower portion of FIG. 1, the information processing device 11 estimates a position, a moving speed, and a moving direction of the pedestrian H1 at a time t2 which is the future of a predetermined time as a motion on the basis of the detection result. Further, the motion of the pedestrian H1 estimated here indicates a change in the position of the pedestrian H1 which is assumed chronologically and does not indicate an action of holding and opening hands or an action of opening and closing the feet.

On the basis of the detection result of the pedestrian H1 at the time t1 and the motion estimation result of the pedestrian H1 at the time t2, the information processing device 11 plans a sound reproduction schedule indicating which content is to be output by which effect among content serving as an advertisement sound to be output from the multi-speaker system 14 at each time between the times t1 and t2. Further, at this time, the information processing device 11 plans an image reproduction schedule indicating which content is to be displayed at which position among content serving as an advertisement image to be displayed in the display units 13-1 to 13-3.

The information processing device 11 controls the multi-speaker system 14 on the basis of the planned sound reproduction schedule such that the advertisement sound is output so that the advertisement sound is appropriately heard at each position in accordance with the motion of the pedestrian H1 who is the moving listener at each time.

In other words, the information processing device 11 controls the multi-speaker system 14 such that a sound which the pedestrian H1($t$11) located at a position at which the pedestrian H1 is estimated to pass at a time t11 can hear as an appropriate sound can be output through the wave field synthesis.

At the same time, the information processing device 11 controls the display units 13-1 to 13-3 on the basis of the planned image reproduction schedule such that the advertisement image is displayed so that the advertisement image can be viewed at each position in accordance with the motion of the pedestrian H1 who is the moving listener at each time.

In other words, the information processing device 11 controls the display unit 13-2 such that an image which the pedestrian H1 located at a position at which the pedestrian H1($t$11) is estimated to pass at the time t11 can view as an appropriate image can be displayed through the display unit 13-2, for example.

Accordingly, even when the pedestrian H1 moves along the passage 15, the pedestrian H1 can hear the advertisement sound appropriately and further view the advertisement image in accordance with the motion of the pedestrian H1.

As a result, it is possible to the advertisement including the sound and the image to be appropriately recognized in accordance with the motion of moving pedestrian H1.

<Hardware Configuration Example of Information Processing Device>

Next, a hardware configuration example of the information processing device 11 will be described with reference to a hardware block diagram of FIG. 3.

For example, the information processing device 11 is configured as a controller for the display unit 13 and the multi-speaker system 14, and includes a control unit 31, an input unit 32, an output unit 33, a storage unit 34, a communication unit 35, a drive 36, and a removable storage medium 37 which are electrically connected to one another via a bus 38.

The control unit 31 is constituted by a processor and a memory, and controls an overall operation of the information processing device 11. Further, the control unit 31 includes an audio processing unit 51 and an image processing unit 52, and controls an output of an advertisement sound and display of an advertisement image.

The input unit 32 is constituted by a keyboard, an operation button, or the like, and receives an operation input of a user and outputs the operation input to the control unit 31 via the bus 38.

The output unit 33 outputs an image to the display unit 13 constituted by a display such as a liquid crystal display (LCD), an organic electro luminescence (EL), or the like so that the image is displayed and outputs a sound signal to the multi-speaker system 14 so that a sound is output.

The storage unit 34 is constituted by a hard disk drive (HDD), a solid state drive (SSD), a semiconductor memory, or the like and is controlled by the control unit 31 and writes or reads various types of data and programs.

The communication unit 35 is controlled by the control unit 31 and performs transmission and reception of various types of data and programs with an external server or the like (not illustrated) via a network represented by a local area network (LAN) or the like in a wired or wireless manner.

The drive 36 reads or writes data from or in a removable storage medium 37 such as a magnetic disk (including a flexible disk), an optical disk (including a compact disc-read only memory (CD-ROM), a digital versatile disc (DVD), a Blu-ray (a registered trademark) disc, and an archival disc), a magneto-optical disk (including a mini disc (MD)), or a semiconductor memory.

<Functional Configuration Example Realized by Information Processing Device>

Next, functions realized by the information processing device 11 will be described with reference to a functional block diagram of FIG. 4.

The functions realized by the information processing device 11 are realized by the audio processing unit 51 and the image processing unit 52 in the control unit 31. Further, audio data 111 for an advertisement, image data 112 for an advertisement, and subtitle data 113 are stored in the storage unit 34.

The audio processing unit 51 controls the output of the advertisement sound by controlling the multi-speaker system 14 using the audio data 111 for the advertisement stored in the storage unit 34.

The image processing unit 52 controls the display of the advertisement image by controlling the display unit 13 using the image data 112 for the advertisement and the subtitle data 113 stored in the storage unit 34.

The audio processing unit 51 includes a motion estimating unit 71, a reproduction schedule generating unit 72, an attribute estimating unit 73, an audio data acquiring unit 74, a sound field synthesis parameter generating unit 75, a sound field synthesizing unit 76, and an N-channel amplifying unit 77.

The motion estimating unit 71 detects the position, the moving speed, and the moving direction of the pedestrian on the passage who is the listener on the basis of the image of the passage captured by the sensor 12. Then, the motion estimating unit 71 estimates the chronological position of the pedestrian in the future of a predetermined time on the basis of the detected position, the moving speed, and the moving direction of the pedestrian on the passage as the motion, and outputs a motion estimation result to the reproduction schedule generating unit 72.

The reproduction schedule generating unit 72 generates a reproduction schedule of the advertisement sound on the basis of information of the chronological position of the pedestrian in the future of a predetermined time in the motion estimation result and outputs the reproduction schedule of the advertisement sound to the audio data acquiring unit 74 and the sound field synthesis parameter generating unit 75 and an image reproducing unit 91 and a subtitle reproducing unit 92 of the image processing unit 52.

Figure 5:
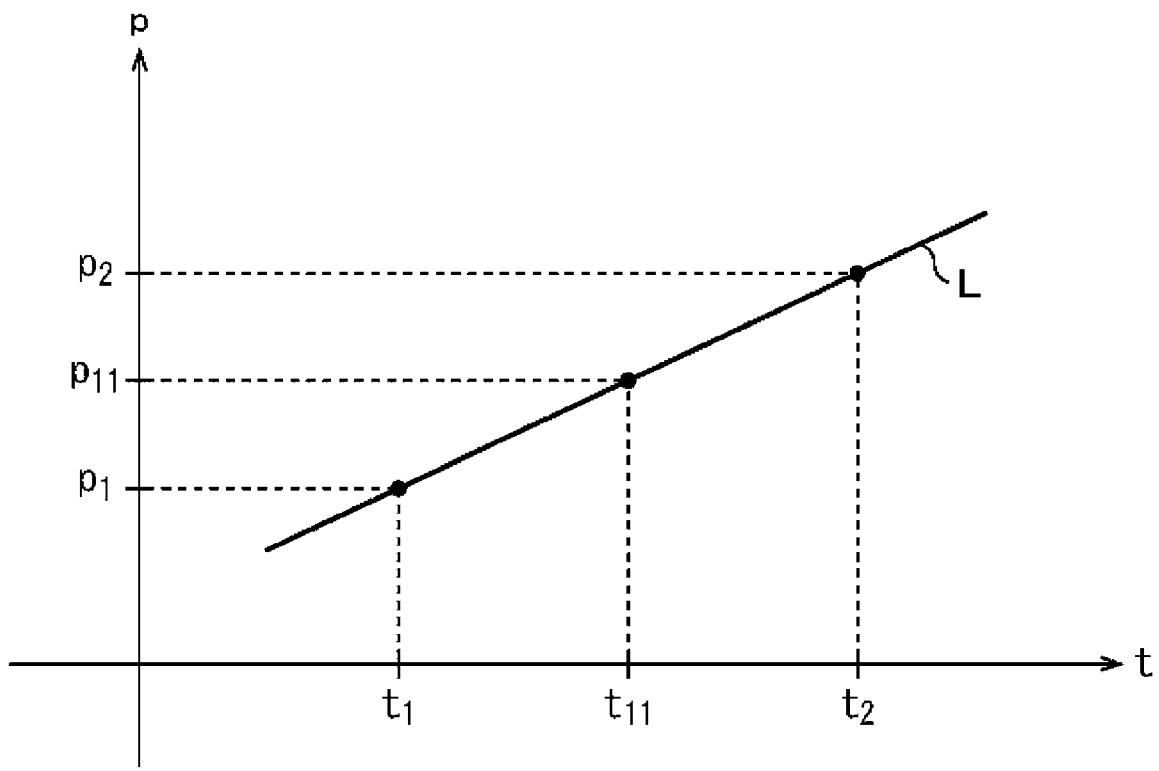
FIG. 5 is a diagram for describing motion estimation.

For example, as illustrated in FIG. 5, in a case where a central position of the pedestrian is detected at a position P1 from the image captured at a time t1 by the sensor 12, a position at a time t2 in the future of a predetermined time is estimated, for example, as a position P2 in a predetermined direction from the position P1 on the basis of the moving speed and the moving direction at the time t1.

In this case, it is estimated that the central position of the pedestrian moves while drawing a locus obtained by connecting the positions P1 and P2 by a straight line as indicated by a straight line L of FIG. 5. Here, the slope of the straight line L of FIG. 5 is a slope corresponding to the moving speed.

Therefore, the position chronologically moving on the straight line L at the times t1 and t2 is estimated as the motion. When the motion estimation result is indicated by the straight line L of FIG. 5, the reproduction schedule generating unit 72 generates a reproduction schedule of outputting the advertisement sound to which any one of the effects described with reference to FIG. 2 or an effect of a combination thereof is added so that the pedestrian can hear the advertisement sound appropriately at a position corresponding to each time on the straight line L. For this reason, the reproduction schedule can be regarded as a reproduction scenario of the sound and the image. Further, the reproduction schedule here is also a reproduction schedule of causing the advertisement image which the pedestrian can view appropriately to be displayed at the position of the pedestrian corresponding to each time.

Therefore, the reproduction schedule in which, in a case where the pedestrian moves along the straight line L, the advertisement sound to which any one of the effects described with reference to FIG. 2 or an effect of a combination thereof is added is output at a corresponding position P11 at the time t11 out of the times t1 and t2 so that the pedestrian who is the listener can hear it appropriately, and the advertisement image is displayed at the corresponding position so that the pedestrian can view an appropriate image is generated.

The attribute estimating unit 73 is constituted by a recognizers or the like, and estimates an attribute into which a situation of the pedestrian (listener) hearing (viewing) the advertisement is classified on the basis of the image or the sound captured by the sensor 12 and outputs an attribute estimation result to then audio data acquiring unit 74, the image reproducing unit 91, and the subtitle reproducing unit 92.

Further, a type of attribute indicating the situation of the pedestrian classified in the attribute estimating unit 73 is information which can be recognized on the basis of at least one of an image or a sound and is, for example, information indicating the presence or absence of a pedestrian, for example.

Further, in a case where there is a pedestrian, the type of attribute indicating the situation of the pedestrian includes, for example, information of an analysis result such as individual identification information of a pedestrian, a male, a female, an age, a nationality, a speaking language, one man, one woman, a group of a plurality of men, a group of a plurality of women, a group of mixed men and women, and a family which is recognized by analysis using at least one of the image or the sound.

Further, the type of attribute indicating the situation of the pedestrian includes, for example, information of an analysis result indicating a facial expression of a pedestrian, an emotion estimated from a facial expression or the like of a pedestrian, or the like, and a state of a behavior of a pedestrian (including standing still, walking, running, or a gesture) which is recognized by analysis using at least one of the image or the sound.

Further, type of attribute indicating the situation of the pedestrian includes, for example, information used in nonverbal cues or the like such as a facial expression, a facial color, a line of sight, a body gesture, a hand gesture, a body posture, how to put a physical distance with a counterpart, clothes, a hair style, breathing, a voice tone, or a voice quality. Further, the type of classification of the attribute indicating the situation of the pedestrian here is an example, and other types of attributes may be set. Further, the attribute estimating unit 73 may be realized by a recognizer having a learning function, an artificial intelligence (AI), or the like.

On the basis of the reproduction schedule supplied from the reproduction schedule generating unit 72 and the attribute estimation result supplied from the attribute estimating unit 73, the audio data acquiring unit 74 accesses the storage unit 34, acquires the audio data 111 for the corresponding advertisement, and outputs the acquired audio data 111 to the sound field synthesis parameter generating unit 75.

The audio data 111 for the advertisement is audio data constituted by a plurality of types of content corresponding to the attribute such as a male, a female, an age group, a nationality, a group of men, a group of women, a group of mixed men and women, and a family. Therefore, the audio data acquiring unit 74 acquires the audio data (content) for the advertisement corresponding to the estimated attribute which is specified in the reproduction schedule, and outputs the acquired audio data to the sound field synthesis parameter generating unit 75.

On the basis of the reproduction schedule and the audio data 111 supplied from the audio data acquiring unit 74, the sound field synthesis parameter generating unit 75 generates a sound field synthesis parameter necessary for synthesizing the sound field, and outputs the sound field synthesis parameter to the sound field synthesizing unit 76.

The sound field synthesizing unit 76 controls the N-channel amplifying unit 77 on the basis of the sound field synthesis parameter supplied from the sound field synthesis parameter generating unit 75 such that it is output to the multi-speaker system 14 as sound.

The N-channel amplifying unit 77 controls each of speakers of N channels constituting the multi-speaker system 14 in accordance with a control signal supplied from the sound field synthesizing unit 76 such that a sound is output. With a series of processes described above, the wave field synthesis for realizing the effect specified by the reproduction schedule is realized, and the advertisement sound to which the effects described with reference to FIG. 2 are added is output.

The image processing unit 52 includes the image reproducing unit 91, the subtitle reproducing unit 92, and a subtitle imposing unit 93.

On the basis of the reproduction schedule supplied from the reproduction schedule generating unit 72 and the attribute estimation result supplied from the attribute estimating unit 73, the image reproducing unit 91 accesses the storage unit 34, reads and reproduces the image data 112 for the corresponding advertisement, and outputs the image data 112 for the corresponding advertisement to the subtitle imposing unit 93.

The image data 112 for the advertisement is the image data 112 including a plurality of types of content corresponding to the attributes such as a male, a female, an age group, a nationality, a group of men, a group of women, a group of mixed men and women, and a family. Therefore, the image reproducing unit 91 responds to a predetermined timing in the reproduction schedule, reads and reproduces the image data 112 of the content for the advertisement corresponding to the attribute as the attribute estimation result, and outputs the image data 112 to the subtitle imposing unit 93.

On the basis of the reproduction schedule supplied from the reproduction schedule generating unit 72 and the attribute estimation result supplied from the attribute estimating unit 73, the subtitle reproducing unit 92 accesses the storage unit 34 and reads and reproduces the subtitle data 113, and outputs the subtitle data 113 to the subtitle imposing unit 93.

The subtitle data 113 for the advertisement is the subtitle data 113 including a plurality of types of content corresponding to the attributes such as a male, a female, an age group, a nationality, a group of men, a group of women, a group of mixed men and women, and a family. For this reason, the subtitle reproducing unit 92 reads and reproduces the subtitle data 113 of the content for the advertisement corresponding to the attribute serving as the attribute estimation result which is the subtitle data 113 corresponding to a predetermined timing in the reproduction schedule, and outputs the subtitle data 113 to the subtitle imposing unit 93.

The subtitle imposing unit 93 imposes an image of a subtitle which is reproduced and output from the subtitle reproducing unit 92 on an image which is reproduced and output from the image reproducing unit 91 and outputs an imposition result to the target display unit 13 as an image.

<Output Process>

Figure 6:
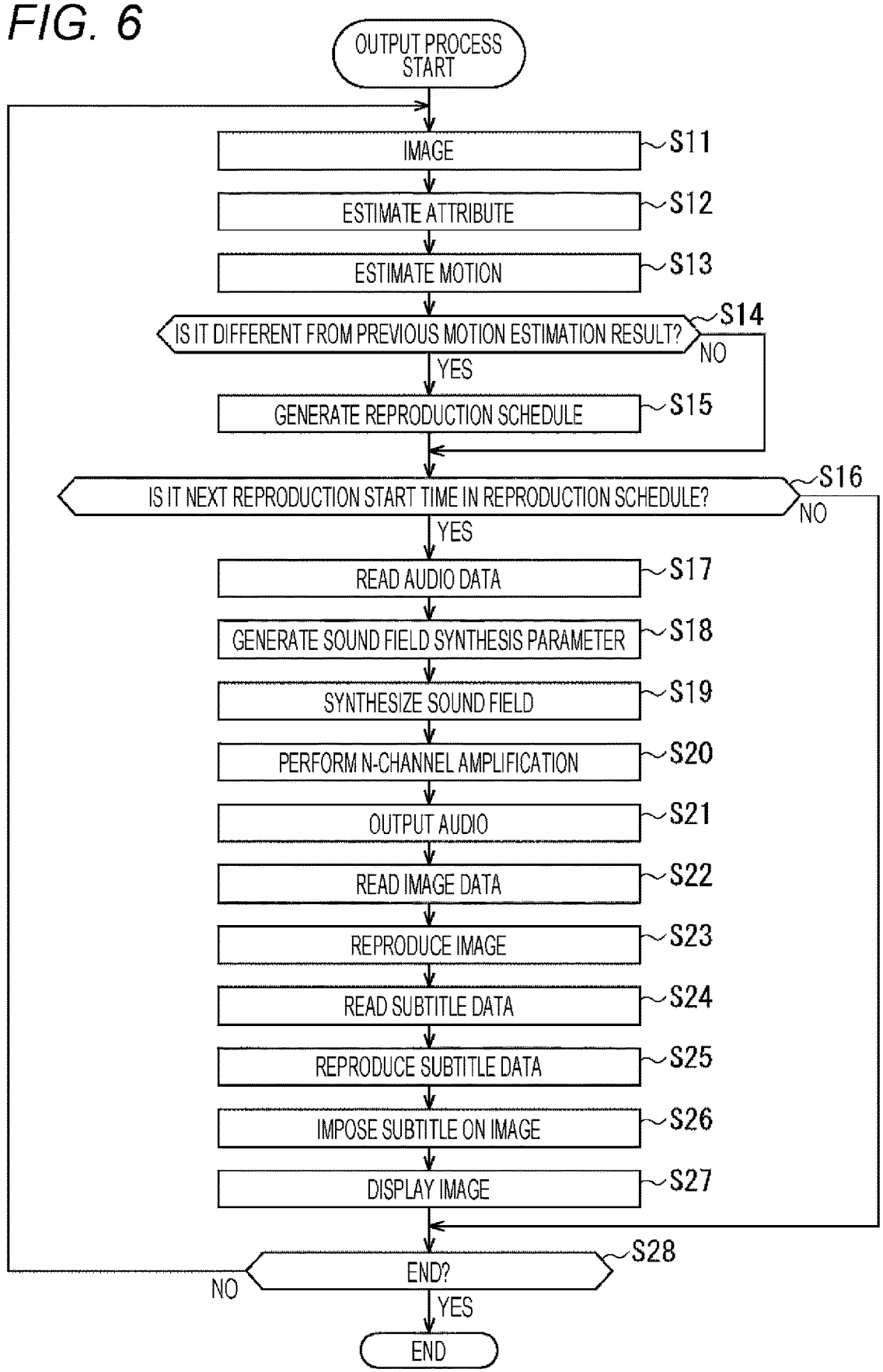
FIG. 6 is a flowchart illustrating an output process in a first embodiment.

Next, an output process of the sound and the image for the advertisement in a first embodiment will be described with reference to a flowchart of FIG. 6.

In step S11, the sensor 12 captures the image of the passage and outputs the captured image to the audio processing unit 51.

In step S12, the attribute estimating unit 73 of the audio processing unit 51 estimates the attribute of the pedestrian on the basis of the captured image, and outputs the attribute estimation result to the audio data acquiring unit 74 and the image reproducing unit 91 and subtitle reproducing unit 92 of the image processing unit 52.

In step S13, the motion estimating unit 71 detects the position, the moving speed, and the moving direction of the pedestrian on the basis of the image captured by the sensor 12, estimates the position of the pedestrian in the future of a predetermined time as a motion, and outputs the motion estimation result to the reproduction schedule generating unit 72.

In step S14, the reproduction schedule generating unit 72 determines whether or not the supplied motion estimation result is different from an immediately previous motion estimation result. In other words, in a case where there is no significant change from the immediately previous motion estimation result, it is desirable to use the reproduction schedule generated on the basis of the immediately previous motion estimation result without change, and the reproduction schedule need not be generated again. To this end, the reproduction schedule generating unit 72 obtains a difference with the immediately previous motion estimation result, compares the difference with a predetermined threshold value, and determines whether or not the supplied motion estimation result is different from an immediately previous motion estimation result by determining whether or not the difference is larger than the threshold value or not. Further, since there is no immediately previous motion estimation result in a first process, the process proceeds while assuming that it is different from the immediately previous motion estimation result.

In a case where it is determined in step S14 that it is the first process or the difference with the immediately previous motion estimation result is larger than the predetermined threshold value, and it is different from the immediately previous motion estimation result, the process proceeds to step S15.

In step S15, the reproduction schedule generating unit 72 generates a schedule of causing an effect to be applied to a sound and a sound in a state in which it can be appropriately heard as a sound to which an effect is applied to be output at the position at each time on the moving path estimated on the basis of the motion estimation result of the pedestrian who is the listener. Then, the reproduction schedule generating unit 72 outputs the information of the generated reproduction schedule to the audio data acquiring unit 74, the sound field synthesis parameter generating unit 75, and the image reproducing unit 91 and the subtitle reproducing unit 92 of the image processing unit 52.

In step S16, the control unit 31 determines whether or not it is a next reproduction start time in the reproduction schedule. Here, for example, since, in the reproduction schedule, a timing to start reproduction of content of a sound and an image of a predetermined advertisement is set by a time, it is determined whether or not it is the reproduction start time of the next content.

In a case where it is determined in step S16 that it is the next content reproduction start time in the reproduction schedule, the process proceeds to step S17.

In step S17, the audio data acquiring unit 74 accesses the storage unit 34, acquires the audio data 111 of the content which starts to be reproduced and corresponds to the attribute serving as the attribute estimation result, and outputs the audio data 111 to the sound field synthesis parameter generating unit 75.

In step S18, the sound field synthesis parameter generating unit 75 generates the sound field synthesis parameter for synthesizing the sound filed in which the sound which can be appropriately heard by the pedestrian who is the listener can be output through the wave field synthesis through the wave field synthesis on the basis of the reproduction schedule, and outputs the sound field synthesis parameter to the sound field synthesizing unit 76 together with the audio data 111.

In step S19, the sound field synthesizing unit 76 synthesizes the sound field by synthesizing the audio data 111 for each channel through a convolutional operation on the basis of the sound field synthesis parameter and the audio data 111, and outputs the sound field to the N-channel amplifying unit 77.

In step S20, the N-channel amplifying unit 77 amplifies the audio data 111 synthesized for each channel, and outputs the audio data 111 to each speaker of the multi-speaker system 14 as the sound signal.

In step S21, the multi-speaker system 14 outputs the sound on the basis of the sound signal supplied from the N-channel amplifying unit 77.

In other words, with a series of processes in steps S19 to S21, the sound in which the sound field is synthesized (wave field synthesized) is output from the multi-speaker system 14.

In step S22, the image reproducing unit 91 accesses the storage unit 34 and reads the image data 112 of the content which starts to be reproduced and corresponds to the attribute serving as the attribute estimation result.

In step S23, the image reproducing unit 91 reproduces the image on the basis of the read image data 112 and outputs the image to the subtitle imposing unit 93.

In step S24, the subtitle reproducing unit 92 accesses the storage unit 34 and reads the subtitle data 113 of the content which starts to be reproduced and corresponds to the attribute serving as the attribute estimation result.

In step S25, the subtitle reproducing unit 92 reproduces the subtitle on the basis of the read subtitle data 113 and outputs the subtitle to the subtitle imposing unit 93.

In step S26, the subtitle imposing unit 93 imposes the subtitle on the reproduced image.

In step S27, the subtitle imposing unit 93 outputs the image obtained by imposing the subtitle to the display unit 13 so that the image is displayed.

In step S28, it is determined whether or not an end instruction is given, and in a case where no end instruction is given, the process returns to step S11, and the subsequent processes are repeated. Then, in a case where an end instruction is given in step S28, the process ends.

Further, in a case where it is determined in step S16 that it is not the next content reproduction start time in the reproduction schedule, the process of steps S17 to S27 is skipped.

With the above process, even when the pedestrian who is the listener continuously moves on the passage 15, the pedestrian can continuously hear the advertisement sound at each position in accordance with the motion in a state in which the effect added to the audio data 111 can be appropriately recognized through the wave field synthesis.

Further, even when the pedestrian who is the viewer continuously moves, the pedestrian can continuously view the advertisement image displayed on the nearby display unit 13 which the pedestrian is passing at an appropriate timing at each position in accordance with the motion.

Further, the sound and the image (including the subtitle) presented to the pedestrian who is the listener are content of the sound and the image (including the subtitle) corresponding to the attribute of the pedestrian, and thus it is possible to cause an easily acceptable advertisement to be presented to the pedestrian who is the listener.

As a result, since it is possible to present the advertisement including the sound and the image constituted by an optimum type of content to the pedestrian who is the listener in accordance with the motion of the pedestrian, it is possible to cause an advertisement effect to be improved.

Further, it is possible to provide an advertisement including an effective sound content to the listener who is an advertisement target in a digital signage or the like.

Further, in a case where it is possible to change a language and provide an advertisement if it is possible to recognize a nationality or the like as an attribute, it is possible to improve an advertisement effect and a guidance convenience.

Further, it is possible to automatically present an advertisement using a sensor device such as a camera as the sensor 12 without intervention of the user, and it is possible to realize an effective advertisement and guidance corresponding to the target listener together with labor saving.

The example of presenting the advertisement to the target person who is the pedestrian on the passage 15 has been described, but it may be other places as long as there is a pedestrian or an advertisement target person.

Further, in the above description, a case where there is only one pedestrian has been described, but the pedestrian may be a group of a plurality of pedestrians. In the case of a group of a plurality of pedestrians, a group of men only, a group of women only, a group of mixed men and women, a family, or the like may be included in the attribute, and the audio data 111, the image data 112, and the subtitle data 113 corresponding to each group may be prepared, the advertisement sound corresponding to each group may be output, and an image including the subtitle may be displayed.

Further, the number of pedestrians or the number of groups of pedestrians may be two or more, and a sound and an image including content of an appropriate attribute may be presented to each of a pedestrian or a group of pedestrians at an appropriate timing in accordance with the motion by performing a similar process for each of a pedestrian or a group of pedestrians. In particular, through the wave field synthesis, since it is possible to output a sound in which the effects described with reference to FIG. 2 are added to content corresponding to each attribute to each of a plurality of pedestrians and a plurality of groups, it is possible to present an easily acceptable advertisement sound to a plurality of pedestrians or a plurality of groups.

Further, for the sound, the user may be allowed to set transition of a sound source using an authoring tool, and a sound to which an effect of enabling the transition of the sound source to be recognized through the wave field synthesis is added may be output.

The example in which the sound field synthesis parameter related to the wave field synthesis is generated each time in accordance with the position of the pedestrian which is the listener in a listening area, the sound field synthesis parameter and the audio data are synthesized by the convolutional operation for each channel, and the wave field synthesis is performed by using the synthesized audio data of each channel has been described above.

However, the listening area may be divided into a plurality of areas in advance, a wave field synthesis filter may be calculated in advance for each divided area and stored in a lookup table or the like, and when the position of the pedestrian in the listening area is detected, the wave field synthesis may be performed by reading the wave field synthesis filter of the area corresponding to the detected position and performing the filter process.

When the wave field synthesis filter is prepared in advance as described above, it is possible to reduce a computation amount and perform the process related to the wave field synthesis at a high speed. In particular, in a case where it is possible to enable a plurality of pedestrians to individually hear audio data of different languages, if a computation is performed each time, the process is likely to be delayed if a certain number of persons is exceeded, and it is possible to suppress the occurrence of delay by preparing the wave field synthesis filter.

Further, in the above process, the imposed subtitle of the pedestrian determined by the attribute of the pedestrian is displayed on display unit 13 together with the advertisement image, and thus even in a case where an advertisement is unable to be appropriately provided only with sound content, it is possible to reliably present the advertisement.

2. Second Embodiment

<Example of Outputting Sound and Displaying Image for Each Area>

The example of outputting the advertisement sound and displaying the image in accordance with the position of the pedestrian in the passage has been described above, but in a case where a plurality of pedestrians or a plurality of pedestrian groups are walking, there is a limitation to the number of individual persons or the number of groups to be processed individually. In this regard, the passage may be divided into a plurality of areas, and the output of the advertisement sound and the display of the image may be switched for each area in accordance with the attribute of the pedestrian or the group of pedestrians located in each area. Further, in a case where there are a plurality of groups or a plurality of pedestrians in the same area, content having a priority is decided in advance, and the content is presented. For example, content is assumed to be presented in order of English, Chinese, and Japanese in the descending order of priorities.

Figure 7:
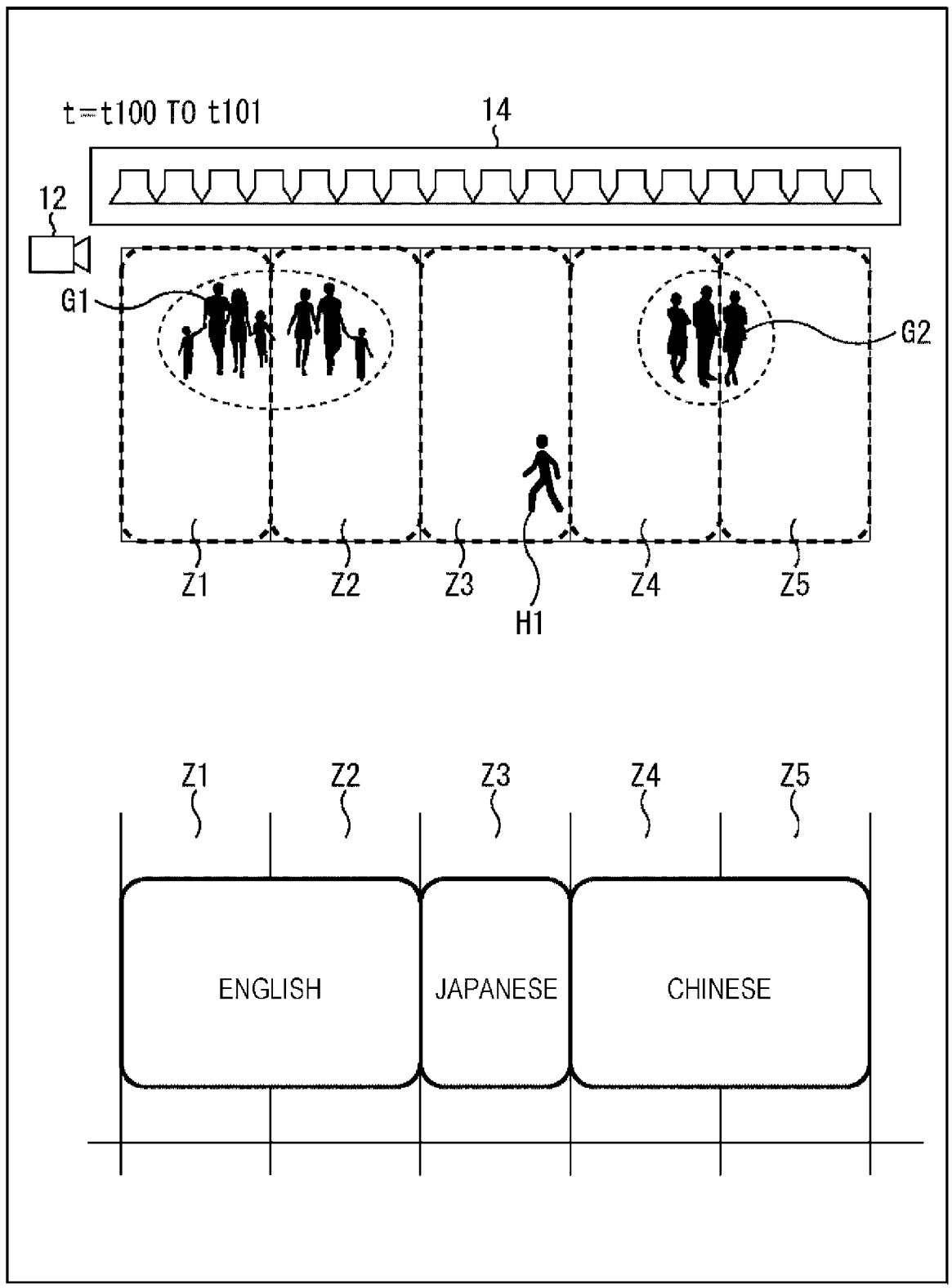
FIG. 7 is a diagram for describing an example of outputting a sound and displaying an image for each area.
Figure 8:
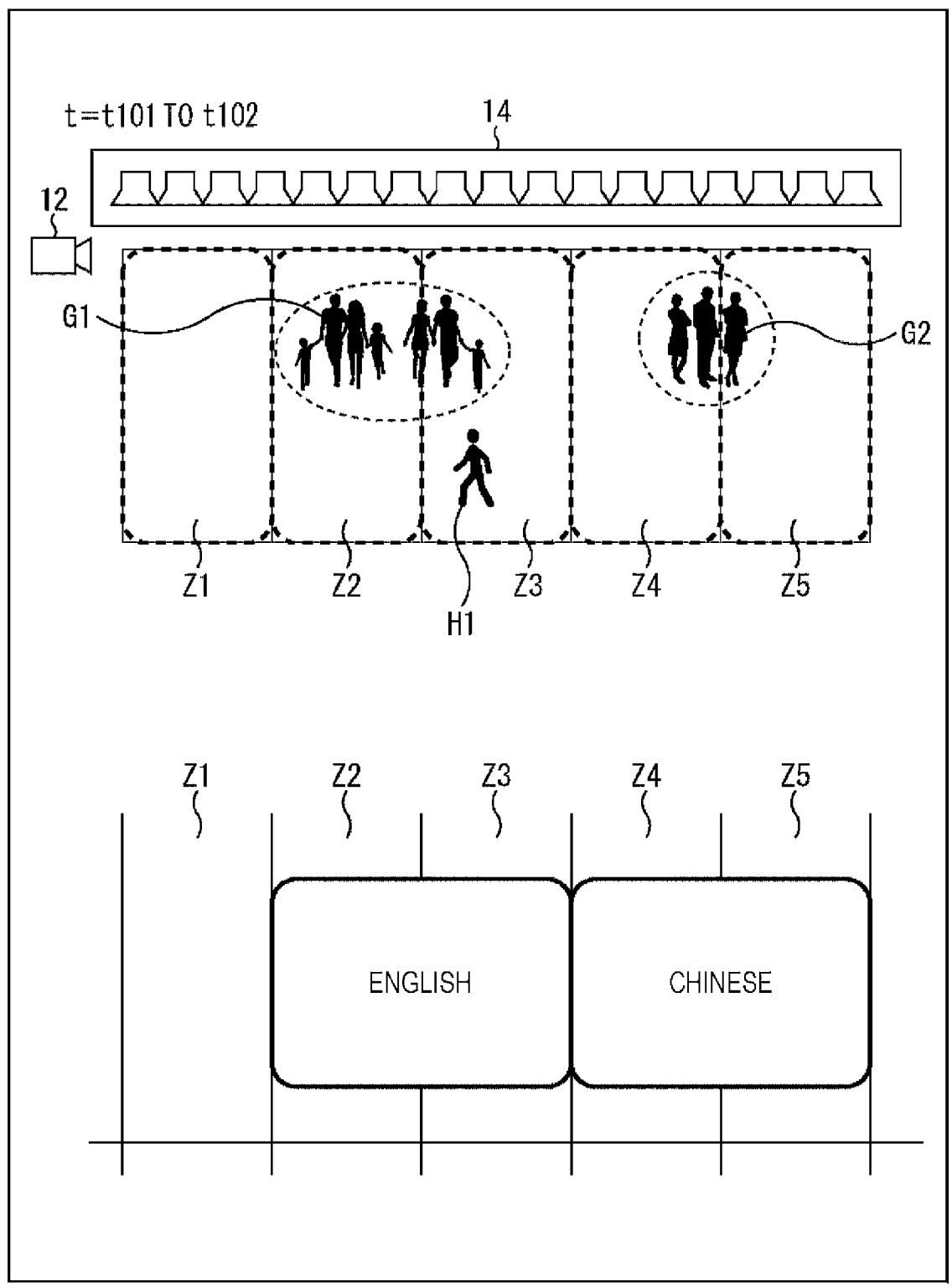
FIG. 8 is a diagram for describing an example of outputting a sound and displaying an image for each area.
Figure 9:
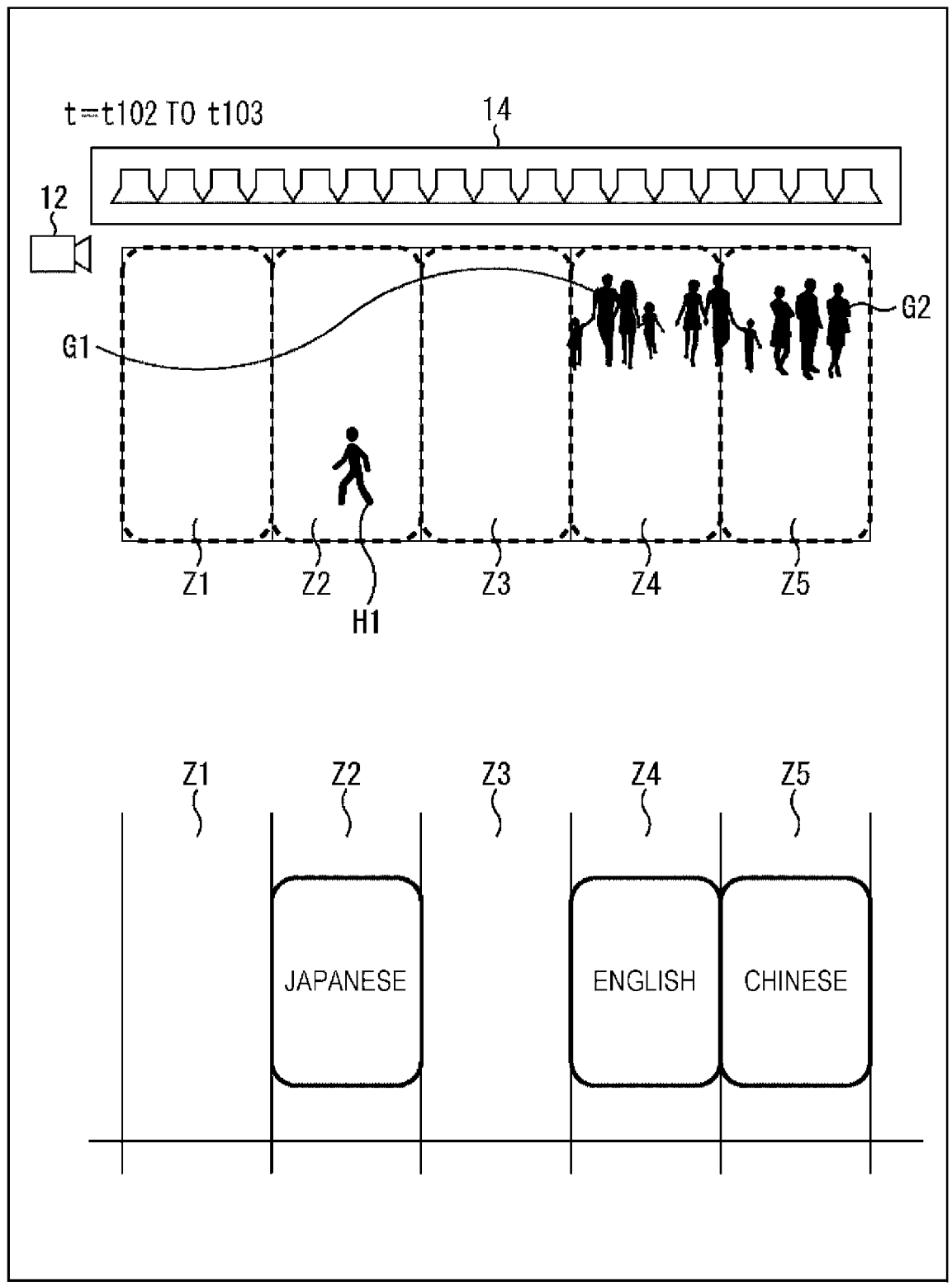
FIG. 9 is a diagram for describing an example of outputting a sound and displaying an image for each area.

For example, a case where a group G1 of pedestrians, a group G2 of pedestrians, and a pedestrian H1 are located at positions indicated in upper portions of FIGS. 7 to 9 at times t100 to t101, times t101 to t102, and times t102 to t103 is considered. Further, it is assumed that the passage is divided into five areas Z1 to Z5, and the illustration of the display unit 13 is omitted, but the display unit 13 is assumed to be located at the position corresponding to each of the areas Z1 to Z5 as well. Further, the attribute estimating unit 73 is assumed to classify the group G1 of the pedestrians, the group G2 of pedestrians, and the pedestrian H1 into attributes indicating a group of pedestrians whose speaking language is English, a group whose speaking language is Chinese, and a pedestrian whose speaking language is Japanese.

In other words, in the times t100 to t101, it is recognized on the basis of the image captured by the sensor 12 that the group G1 is located over the areas Z1 and Z2, the group G2 is located over the area Z4 and Z5, and the pedestrian H1 is located in the area Z3 as illustrated in the upper portion of FIG. 7. Further, on the basis of the image captured by the sensor 12, a motion is estimated from the moving speed and the moving direction of each of the groups G1 and G2 and the pedestrian H1, and the position at the times t102 and t103 is estimated.

Further, in the times t100 to t101, on the basis of the arrangement of the groups G1 and G2 and the pedestrian H1 illustrated in the upper portion of FIG. 7, the multi-speaker system 14 outputs a sound of content of English to the areas Z1 and Z2 as the advertisement sound for the group G1, outputs a sound of content of Chinese to the areas Z4 and Z5 as the advertisement sound for the group G2, and outputs a sound of Japanese to the area Z3 as the advertisement sound for the pedestrian H1 as illustrated in a lower portion of FIG. 7.

Further, in times t101 to t102, it is assumed to be estimated on the basis of an estimation result that the group G1 is located over the areas Z2 and Z3, the group G2 is located over the areas Z4 and Z5, and the pedestrian H1 is located in the area Z3, for example, as illustrated in an upper portion of FIG. 8.

In this regard, in the times t101 to t102, on the basis of the arrangement of the groups G1 and G2 and the pedestrian H1 illustrated in the upper portion of FIG. 8, the multi-speaker system 14 outputs a sound of content of English to the area Z2 as the advertisement sound for the group G1, outputs a sound of content of Chinese to the areas Z4 and Z5 as the advertisement sound for the group G2, and outputs a sound of Japanese to the area Z3 as the advertisement sound for the pedestrian H1 in accordance with the set priority as illustrated in a lower portion of FIG. 8.

Further, both the group G1 whose speaking language is English and the pedestrian H1 whose speaking language is Japanese are located in the area Z3 of FIG. 8, but here, the sound of the content of English having a higher priority than Japanese is output to the areas Z2 and Z3. As the sounds are output as described above, in the pedestrians located in the areas Z2 and Z3, the advertisement can be presented to the group G1 of pedestrians having English as the speaking language which are overwhelmingly in the majority, and thus the advertisement effect can be increased.

Further, in times t102 to t103, it is assumed to be estimated on the basis of an estimation result that the group G1 is located in the area Z4, the group G2 is located in the area Z5, and the pedestrian H1 is located in the area Z2, for example, as illustrated in an upper portion of FIG. 9.

In this regard, in the times t102 to t103, on the basis of the arrangement of the groups G1 and G2 and the pedestrian H1 illustrated in the upper portion of FIG. 9, the multi-speaker system 14 outputs a sound of content of English to the area Z4 as the advertisement sound for the group G1, outputs a sound of content of Chinese to the area Z5 as the advertisement sound for the group G2, and outputs a sound of content of Japanese to the area Z2 as the advertisement sound for the pedestrian H1 as illustrated in a lower portion of FIG. 9.

Figure 10:
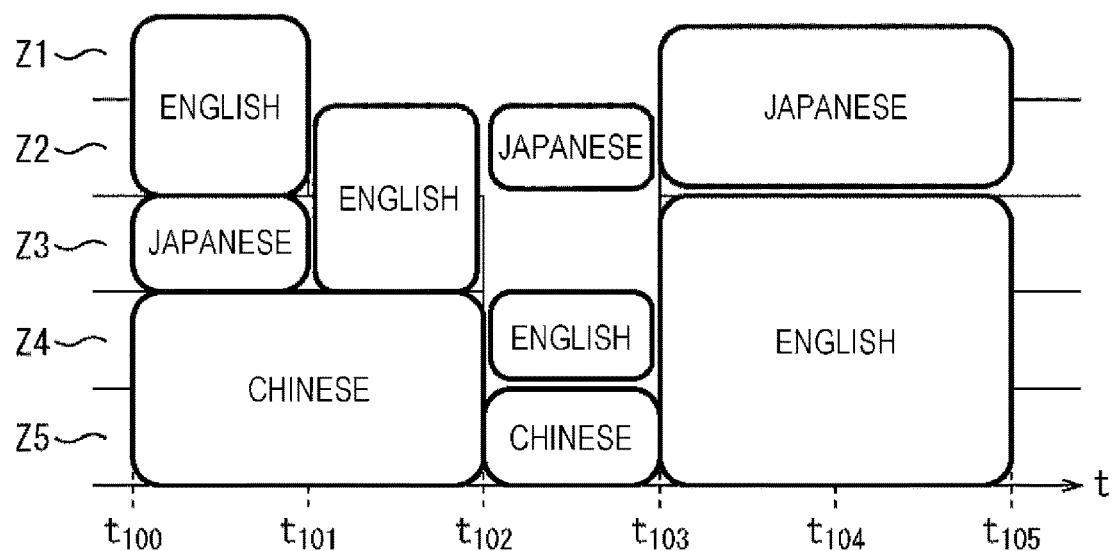
FIG. 10 is a diagram for describing an example of outputting a sound and displaying an image for each area.

For example, a reproduction schedule illustrated in FIG. 10 is planned from the results of the times t101 to t103 described with reference to FIGS. 7 to 9.

As illustrated in FIG. 10, in the times t100 to t101, as described above with reference to FIG. 7, the sound of content of English is output in the areas Z1 and Z2, the sound of content of Japanese is output in the area Z3, and the sound of content of Chinese is output in the areas Z4 and Z5.

Further, in the times t101 to t102, as described above with reference to FIG. 8, the sound of content of English is output in the areas Z2 and Z3, and the sound of content of Chinese is output in the areas Z4 and Z5.

Further, in the times t102 to t103, as described above with reference to FIG. 9, the sound of content of Japanese is output in the area Z2, the sound of content of English is output in the area Z4, and the sound of content of Chinese is output in the area Z5.

Further, FIG. 10 illustrates an example in which, in the times t103 to t105, the sound of content of Japanese is output in the areas Z1 and Z2, and the sound of content of English is output in the areas Z3 to Z5.

Further, although not illustrated, a corresponding image is displayed on the display unit 13 in a corresponding area, similarly to the sound. Further, in FIG. 10, for example, only BGM may be reproduced in an area in which the reproduction schedule is not set for content of any of English, Chinese, and Japanese.

As described above, a sound corresponding to a category of the pedestrian or the group of pedestrians located in each of areas classified into a plurality of areas Z1 to Z5 may be output on the basis of the motion estimation result based on the position, the moving speed, and the moving direction of the pedestrian or the group of pedestrians.

<Switching Corresponding to Length of Content>

Further, the example in which, in the area in which the estimated pedestrian or the group of pedestrians are located, the output of the content of the sound of a corresponding attribute and the display of the image are performed for each area, but content of an advertisement sound having a different length is switched and output in accordance with a length of time in which the pedestrian or the group of pedestrians are estimated to be located in the area (listening area) to which the sound is output, and the image may be displayed.

Figure 11:
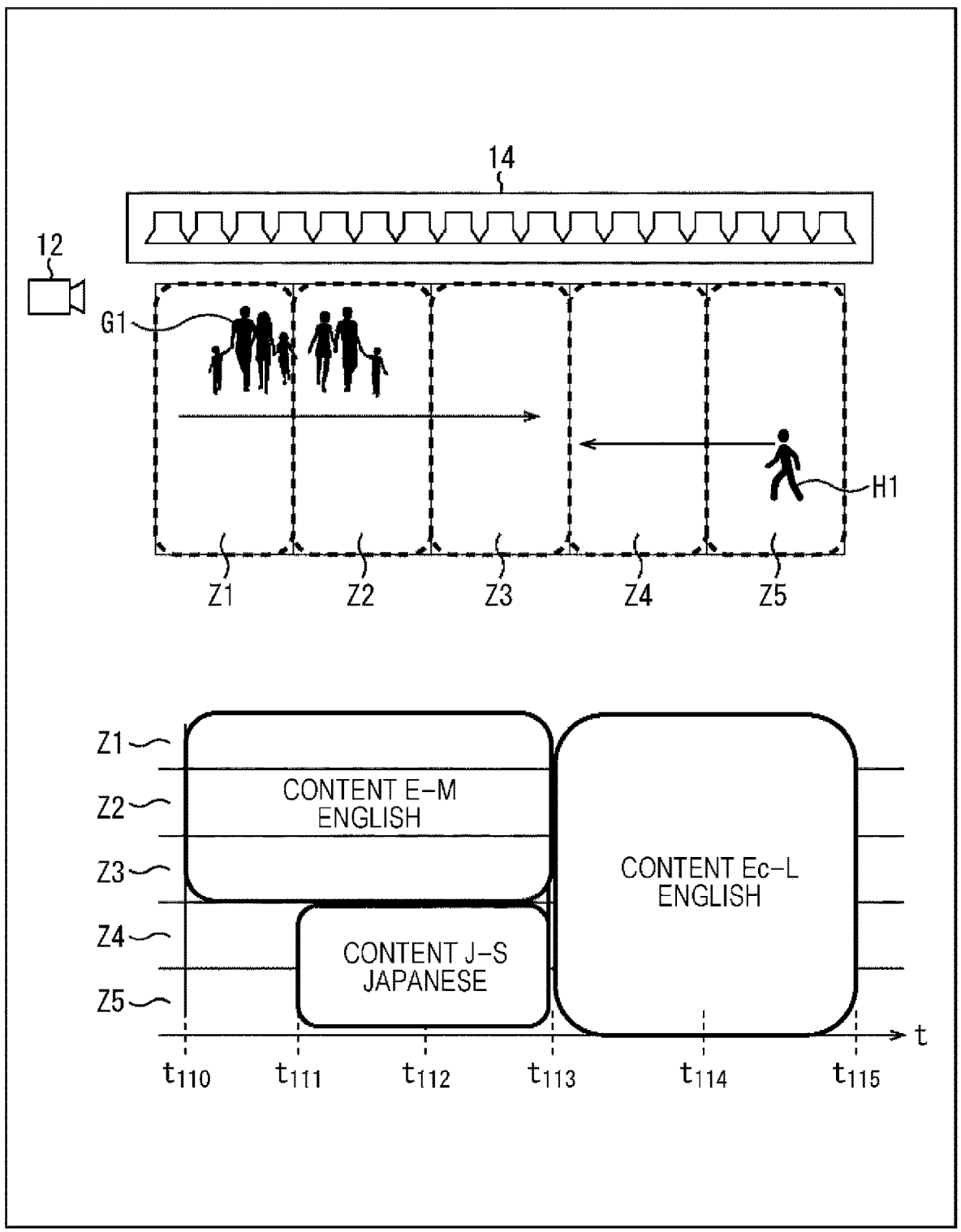
FIG. 11 is a diagram for describing an example of outputting a sound and displaying an image for each area.

In other words, for example, a case where the group G1 is located in the area Z1, the pedestrian H1 is located in the area Z5, and the group G1 and the pedestrian H1 are moving in moving directions indicated by arrows at the same speed as illustrated in an upper portion of FIG. 11 is considered.

For example, it is assumed to be estimated that, in times t110 to t111, the group G1 is located over the areas Z1 and Z2, and the pedestrian H1 is not located in any of the areas Z1 to Z5, in time t111 to t112, the group G1 is located over the areas Z2 and Z3, and the pedestrian H1 is not located in the area Z5, in time t112 to t113, the group G1 is located in the areas Z3 and Z4, and the pedestrian H1 is not located in the area Z4, and in time t113 to t115, both the group G1 and the pedestrian H1 are located in the vicinity of the boundary between the areas Z3 and Z4.

In this case, a reproduction schedule illustrated in a lower part of FIG. 11 is planned. In other words, in the areas Z1 to Z3, in times t110 to t113, a sound including content E-M of English in which the length of the reproduction time is the times t110 to t113 (or the length of time taken for the group G1 to pass the areas Z1 to Z3) is output, and a corresponding image is displayed.

Further, in the areas Z4 to Z5, in the times t111 to t113, a sound including content JS of Japanese in which the length of the reproduction time is the times t112 to t113 (or the length of time taken for the pedestrian H1 to pass the areas Z5 and Z4) is output, and a corresponding image is displayed.

Further, in times t113 to t115, the group G1 and the pedestrian H1 are located in the vicinity of the boundary between the areas Z3 and Z4. In this state, if the sound of the content including any language is output, either the pedestrian H1 or the group G1 of pedestrians is unlikely to be able to be recognized. In this regard, in the times t113 to t115, a sound including content Ec-L of English set as a common language and having a length of the times t113 to t115 is output, and a corresponding image is displayed.

As a result, the group G1 and the pedestrian H1 can completely hear (view) content of a corresponding attribute having an appropriate length until they are in close to each other, and further, content set as a common language is reproduced after they are located near each other.

Further, in a case where the number of pedestrians or the number of groups in the passage 15 exceeds a predetermined number or in a case where the number of attributes to be classified is increased, a processing load for individually reproducing the content is increased. In this regard, in this case, only the content set as the common language may be reproduced regardless of the number of pedestrians or the number of attributes. As a result, even in a case where the number of pedestrians, the number of groups, or the number of attributes to be classified is large, the processing load related to reproduction can be reduced.

<Output Process in a Case where Reproduction Schedule is Set for Each Area>

Figure 12:
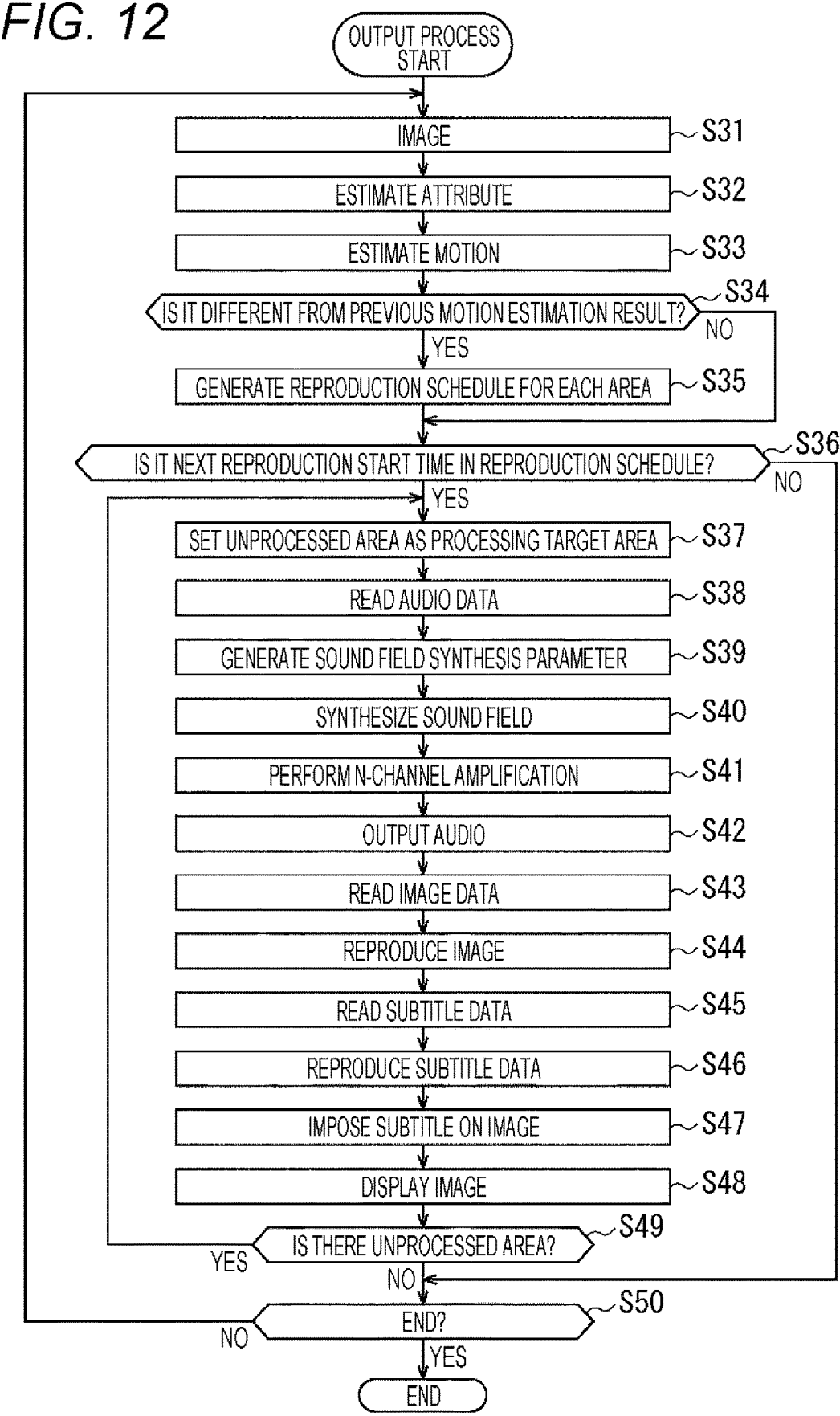
FIG. 12 is a flowchart for describing an output process in a case where a sound is output for each area, and an image is displayed in a second embodiment.

Next, an output process in a case where the reproduction schedule is set for each area will be described with reference to the flowchart of FIG. 12.

In step S31, the sensor 12 captures the image of the passage and outputs the image to the audio processing unit 51.

In step S32, the attribute estimating unit 73 of the audio processing unit 51 estimates the attribute of the pedestrian or the group of pedestrians on the basis of the captured image, and outputs the attribute estimation result to the audio data acquiring unit 74 and the image reproducing unit 91 and the subtitle reproducing unit 92 of the image processing unit 52.

In step S33, the motion estimating unit 71 detects the position, the moving speed, and the moving direction of each of the pedestrian or the group of pedestrians on the basis of the image captured by the sensor 12, estimates the position of each of the pedestrian or the group of pedestrians in the future of a predetermined time, and outputs the motion estimation result to the reproduction schedule generating unit 72.

In step S34, the reproduction schedule generating unit 72 determines whether or not the supplied motion estimation result of the pedestrian or the group of pedestrians is different from the immediately previous motion estimation result.

In a case where it is determined in step S34 that it is the first process or the difference with the immediately previous motion estimation result is larger than the predetermined threshold value, and it is different from the immediately previous motion estimation result, the process proceeds to step S35.

In step S35, the reproduction schedule generating unit 72 generates a schedule of causing a sound which can be appropriately heard in each area as illustrated in FIGS. 7 to 11 to be reproduced on the basis of the position at each time on the estimated moving path of the pedestrian who is the listener or the group of pedestrians on the basis of the motion estimation result. Then, the reproduction schedule generating unit 72 outputs the information of the generated reproduction schedule to the audio data acquiring unit 74, the sound field synthesis parameter generating unit 75, and the image reproducing unit 91 and the subtitle reproducing unit 92 of the image processing unit 52.

In step S36, the control unit 31 determines whether or not it is a next reproduction start time in the reproduction schedule.

For example, in the case of the reproduction schedule illustrated in FIG. 10, at the time t101, reproduction of the content of Japanese and reproduction of the content of Chinese are continued in the areas Z3 to Z5, and thus it is not a timing at which the next reproduction is started, but in the area Z2, but since reproduction of the content of English is newly started, the time t101 is regarded as the next reproduction start time.

On the other hand, in FIG. 10, at the time t104, reproduction of the content of Japanese and reproduction of the content of English are continued in all of the areas Z1 to Z5, and it is not a time at which reproduction of the next content is started in any area. Therefore, the time t104 is not regarded as the next reproduction start time.

In other words, in a case where it is determined in step S36 that the reproduction of the next content is started at any one of all the areas, it is regarded as the next reproduction start time.

In a case where it is determined in step S36 that it is the next content reproduction start time in the reproduction schedule, the process proceeds to step S37.

In step S37, the control unit 31 sets one of unprocessed areas as a processing target area. In other words, for example, in the example of FIGS. 7 to 11, any one unprocessed area among the areas Z1 to Z5 is set as the processing target area.

In step S38, the audio data acquiring unit 74 accesses the storage unit 34, acquires the audio data 111 of the content which starts to be reproduced in the processing target area and corresponds to the attribute, and outputs the audio data 111 to the sound field synthesis parameter generating unit 75.

The audio data 111 acquired here may correspond only to the attribute, and in a case where the pedestrian and the group of pedestrians having different attributes are located in the passage as described with reference to FIG. 11, the audio data 111 of the content in which the length corresponding to the time taken until the pedestrian and the group of pedestrians having different attributes are close to each other is considered may be acquired.

Further, in a case where an area in which reproduction of new content is not started is the processing target area, the process of steps S38 to S48 is skipped.

In step S39, the sound field synthesis parameter generating unit 75 generates the parameter for synthesizing the sound filed in which the sound which can be appropriately heard by the pedestrian who is the listener in the processing target area can be output through the wave field synthesis on the basis of the reproduction schedule and the audio data 111 in the processing target area, and outputs the parameter to the sound field synthesizing unit 76 together with the audio data 111.

In step S40, the sound field synthesizing unit 76 synthesizes the sound field by synthesizing the audio data 111 for each channel through a convolutional operation on the basis of the sound field synthesis parameter and the audio data 111, and outputs the sound field to the N-channel amplifying unit 77.

In step S41, the N-channel amplifying unit 77 amplifies the audio data 111 synthesized for each channel, and outputs the audio data 111 to each speaker of the multi-speaker system 14 as the sound signal.

In step S42, the multi-speaker system 14 outputs the sound to the processing target area on the basis of the sound signal supplied from the N-channel amplifying unit 77.

In other words, with a series of processes in steps S38 to S42, the sound in which the sound field is synthesized (wave field synthesized) is output from the multi-speaker system 14.

In step S43, the image reproducing unit 91 accesses the storage unit 34 and reads the image data 112 of the content which starts to be reproduced in the processing target area and corresponds to the attribute serving as the attribute estimation result.

In step S44, the image reproducing unit 91 reproduces the image on the basis of the read image data 112 and outputs the image to the subtitle imposing unit 93.

In step S45, the subtitle reproducing unit 92 accesses the storage unit 34 and reads the subtitle data 113 of the content which starts to be reproduced in the processing target area and corresponds to the attribute serving as the attribute estimation result.

In step S46, the subtitle reproducing unit 92 reproduces the subtitle on the basis of the read subtitle data 113 and outputs the subtitle to the subtitle imposing unit 93.

In step S47, the subtitle imposing unit 93 imposes the subtitle on the reproduced image.

In step S48, the subtitle imposing unit 93 outputs the image obtained by imposing the subtitle to the display unit 13 so that the image is displayed.

In step S49, the control unit 31 determines whether or not there is an unprocessed area, and in a case where there is an unprocessed area, the process returns to step S37, and the processes of steps S37 to S49 are repeated until there is no unprocessed area. Further, in a case where it is determined in step S49 that there is no unprocessed area, the process proceeds to step S50.

In step S50, it is determined whether or not an end instruction is given, and in a case where no end instruction is given, the process returns to step S31, and the subsequent processes are repeated. Then, in a case where an end instruction is given in step S50, the process ends.

With the above process, even when the pedestrian who is the listener and the group of pedestrians continuously move, the pedestrian and the group of pedestrians can continuously hear the advertisement sound at each position in accordance with the motion in a state in which the effect added to the audio data 111 can be appropriately recognized through the wave field synthesis in an area in which each of the pedestrian or the group of pedestrians is located.

Further, even when the pedestrian who is the viewer and the group of pedestrians continuously moves, the pedestrian and the group of pedestrians can continuously view the advertisement image displayed on the display unit 13 in the area in which the pedestrian or the group of pedestrians passes at an appropriate timing in accordance with the motion in an area in which each of the pedestrian or the group of pedestrians is located.

Further, since the sound and the image (including the subtitle) presented to the pedestrian who is the listener are content of the sound and the image (including the subtitle) corresponding to the attribute of the pedestrian, it is possible to cause an easily acceptable advertisement to be presented to the pedestrian who is the listener and the group of pedestrians.

Further, even when the pedestrian and the group of pedestrians having different attributes are located in the passage, since it is possible to switch and output the sound of the content corresponding to the category and the length corresponding to the time taken until the pedestrian and the group of pedestrians having different attributes are close to each other and switch and display the image, a situation in which the advertisement content is unable to be heard (viewed) in the middle is prevented even when the pedestrian and the group of pedestrians move.

In any case, as a result, it is possible to present the advertisement constituted by the sound and the image including an appropriate type of content for each area in accordance with the motion of the pedestrian in accordance with the attribute of the pedestrian or the position relation with a nearby pedestrian having a different attribute.

3. Third Embodiment

<Adjustment of Volume Corresponding to Distance to Multi-Speaker System>

The example in which the multi-speaker system 14 outputs the advertisement sound through the wave field synthesis in accordance with the motion estimated on the basis of the position, the moving speed, and the moving direction of the pedestrian or the group of pedestrians detected on the basis of the image captured by the sensor 12 has been described, but a volume curve corresponding to a distance from the sound source generated through the wave field synthesis may be set, and the volume may be adjusted in accordance with the moving distance.

Figure 13:
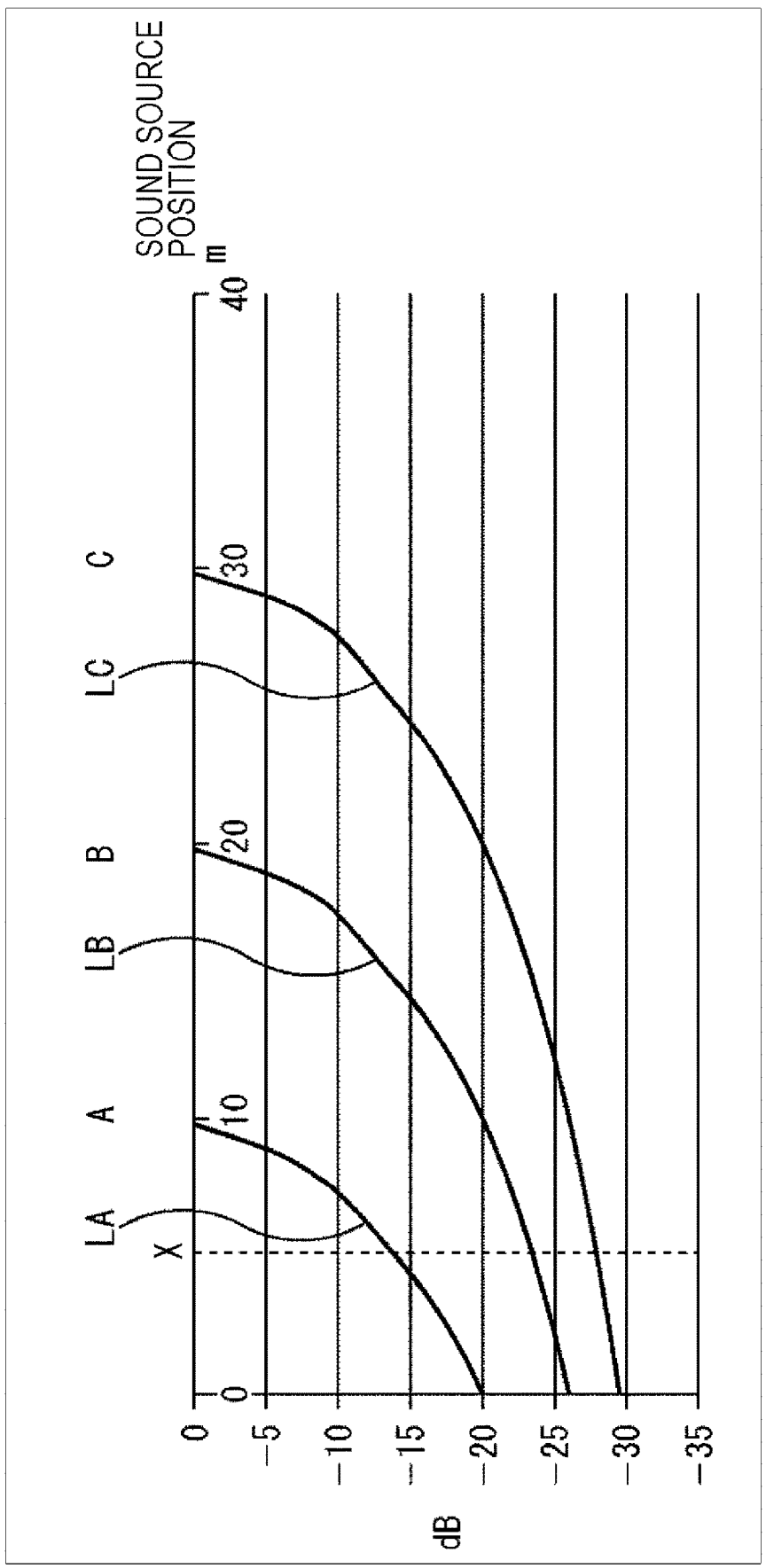
FIG. 13 is a diagram for describing attenuation of a volume corresponding to a distance.

In other words, as illustrated in FIG. 13, in a case where there is a listener at each of positions A, B, and C from the sound source, the level of the volume changes in accordance with the distance from the sound source as indicated by curves LA, LB, and LC.

In FIG. 13, a curve indicating a decrease in volume corresponding to a distance when it gets away from the sound source in a case where the listener is located at the position A at which a distance from a position of "0" on the left side in the drawing is about 10 m is indicated by the curve LA. Further, in FIG. 13, a curve indicating a decrease in volume corresponding to a distance when it gets away from the sound source in a case where the listener is located at the position B at which a distance from a position of "0" is about 20 m is indicated by the curve LB. Further, in FIG. 13, a curve indicating a decrease in volume corresponding to a distance when it gets away from the sound source in a case where the listener is located at the position C at which a distance from a position of "0" is about 30 m is indicated by the curve LC.

In other words, in a case where the sound source gets away from a state in which it is located at a position at which a distance from the position A indicated by a position X is about 5 m to a position O at which the distance is about 10 m when viewed from the position A, the volume at which the listener located at the position A changes from about −14 dB to about −20 dB and decreases by −6 dB, along the curve LA.

However, in a case where the sound source gets away from a state in which it is located at a position at which a distance from the position B indicated by the position X is about 15 m to a position O at which the distance is about 20 m when viewed from the position B, the volume at which the listener located at the position B changes from about −23 dB to about −26 dB and decreases by −3 dB, along the curve LB.

Further, in a case where the sound source gets away from a state in which it is located at a position at which a distance from the position C indicated by the position X is about 25 m to a position O at which the distance is about 30 m when viewed from the position C, the volume at which the listener located at the position C changes from about −28 dB to about −30 dB and decreases by −2 dB, along the curve LC.

Further, in general, if the distance is doubled, the volume decreases by −6 dB, but since it is limited to a case where an ideal condition with no sound reflection or the like is set, the decrease in the volume corresponding to the distance can be changed in accordance with a parameter setting. Therefore, the graph of FIG. 13 is merely an example. Further, the example in a case where the distance between the sound source and the listener increases has been described above, but in a case where the distance decreases, the volume changes to increase.

Since a changing distance and an attenuating volume are different in accordance with the distance between the sound source and the listener as described above, the volume is attenuated on the basis of the volume curve illustrated in FIG. 13, and thus it is possible to give a more appropriate sense of depth.

<Output Process in a Case where Attenuation of Volume Corresponding to Distance is Indicated>

Figure 14:
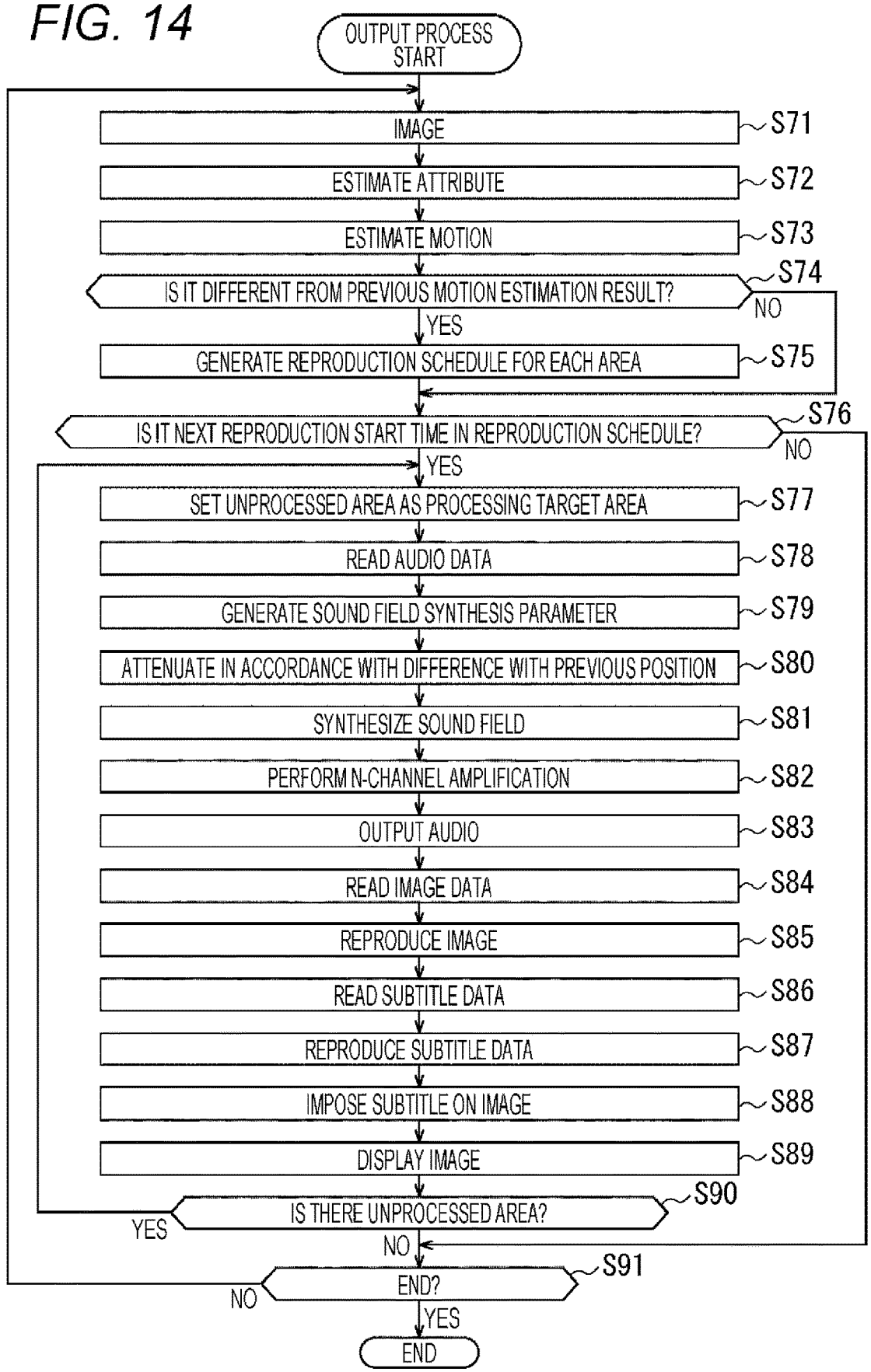
FIG. 14 is a flowchart illustrating an output process in a case where a volume is attenuated in accordance with a distance in a third embodiment.

Next, an output process in a case where the attenuation of the volume corresponding to the distance is indicated will be described with reference to a flowchart of FIG. 14. Further, processes of steps S71 to S79 and steps S81 to S91 in the flowchart of FIG. 14 are similar to the processes described with reference to the flowchart of FIG. 12, and description thereof will be omitted.

In other words, in step S80, on the basis of the reproduction schedule and the audio data 111 in the processing target area, the sound field synthesis parameter generating unit 75 generates a parameter for adjusting the volume of the sound to be heard by the pedestrian which is the listener in the processing target area in accordance with the distance from the sound source in accordance with the distance to the multi-speaker system 14 described with reference to FIG. 13 and outputs the parameter to the sound field synthesizing unit 76.

With this process, in step S81, the sound field synthesizing unit 76 synthesizes the sound field by synthesizing the audio data 111 for each channel through the convolutional operation on the basis of the sound field synthesis parameter and the audio data 111, and outputs the sound field to the N-channel amplifying unit 77. At this time, the sound field synthesizing unit 76 synthesizes a sound field in which the volume is adjusted by synthesizing the audio data 111 for each channel through the convolutional operation in consideration of a volume parameter.

In step S82, the N-channel amplifying unit 77 amplifies the audio data 111 synthesized for each channel whose volume is adjusted in accordance with the distance, and outputs the resulting audio data to each speaker of the multi-speaker system 14 as a sound signal.

Accordingly, even when the pedestrian who is the listener or the group of pedestrians continuously moves, the pedestrian or the group of pedestrians can hear the wave field synthesized sound appropriately in a state in which the volume is adjusted in accordance with the distance between the pedestrian and the sound source realized by the wave field synthesis in an area in which each of the pedestrian or the group of pedestrians is located.

As a result, it is possible to continuously hear the advertisement sound with a sense of depth.

Further, the example in which the volume is appropriately adjusted in accordance with the distance between the pedestrian and the sound source has been described, but the reverberations may be adjusted in accordance with the distance between the pedestrian and the sound source by setting similar curves. Since the reverberations are adjusted, it is possible to hear the advertisement sound with a sense of depth.

4. Fourth Embodiment

<Example of Giving Individual Instructions to Plurality of Listeners Simultaneously>

The example of outputting the advertisement sound and displaying the advertisement image to the pedestrian walking on the passage has been described above, but, for example, the multi-speaker system 14 may be installed in a dance studio or the like instead of the passage, and individual instructions may be given to a plurality of dancers dancing in the studio as listeners.

Figure 15:
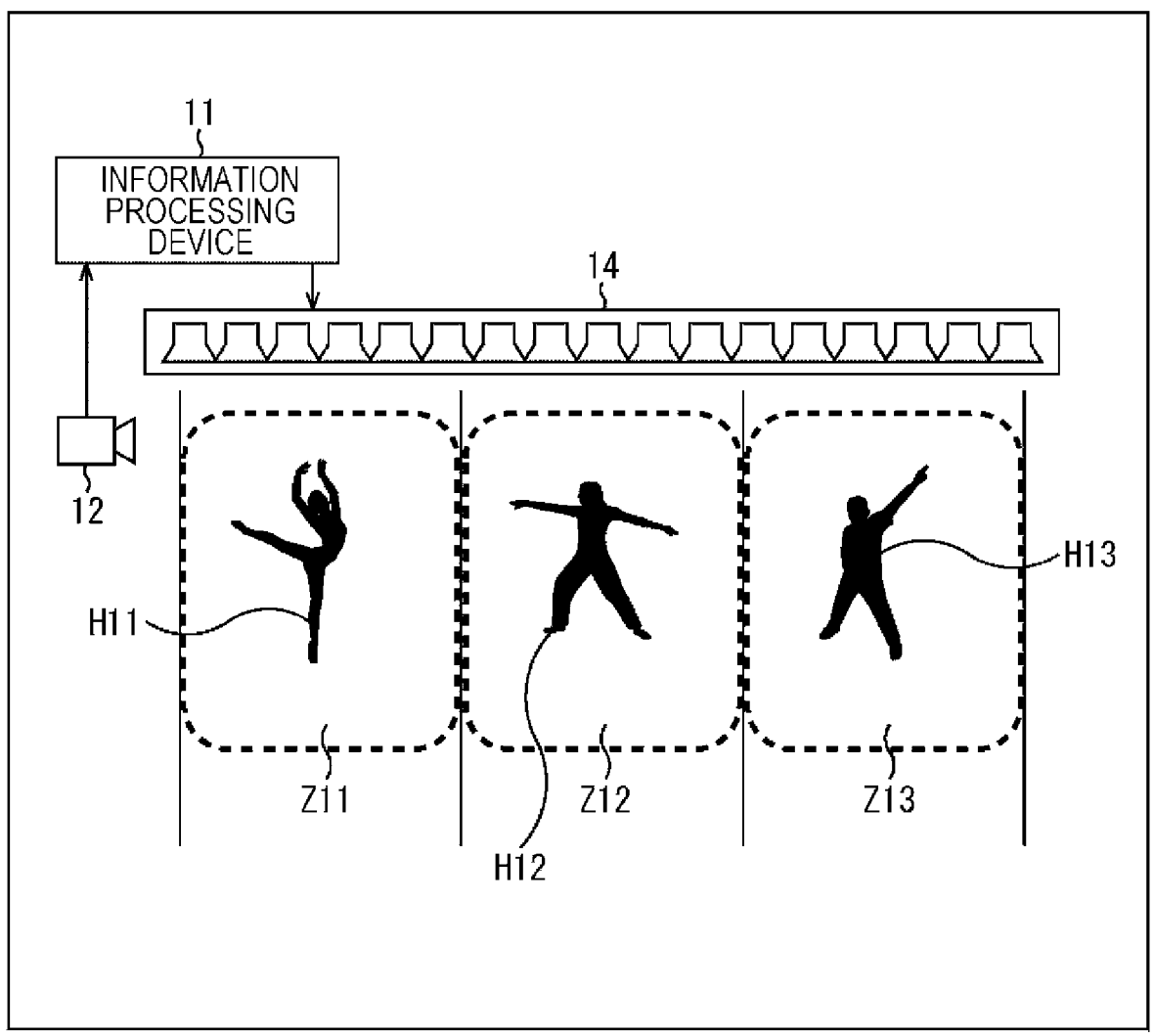
FIG. 15 is a diagram for describing an example of giving individual instructions to a plurality of listeners simultaneously.

In other words, for example, a configuration in which, as illustrated in FIG. 15, the multi-speaker system 14 is placed in a dance studio or the like, an area in front of the multi-speaker system 14 is divided into areas Z11 to Z13, and dancer H11 to H13 are dancing as listeners is considered.

In such a configuration, a cooperative operation as a whole may be realized by conveying sounds with different instruction contents to the dancers H11 to H13 dancing in the areas Z11 to Z13 through the wave field synthesis.

In other words, for example, as illustrated in FIG. 15, the wave field synthesis may be performed so that the dancer H11 dancing in the area Z11 can hear a sound of an instruction "dance like swan," the wave field synthesis may be performed so that the dancer H12 dancing in the area Z12 can hear a sound of an instruction "step out right foot," and the wave field synthesis may be performed so that the dancer H13 dancing in the area Z13 can hear a sound of an instruction "raise left hand."

Figure 16:
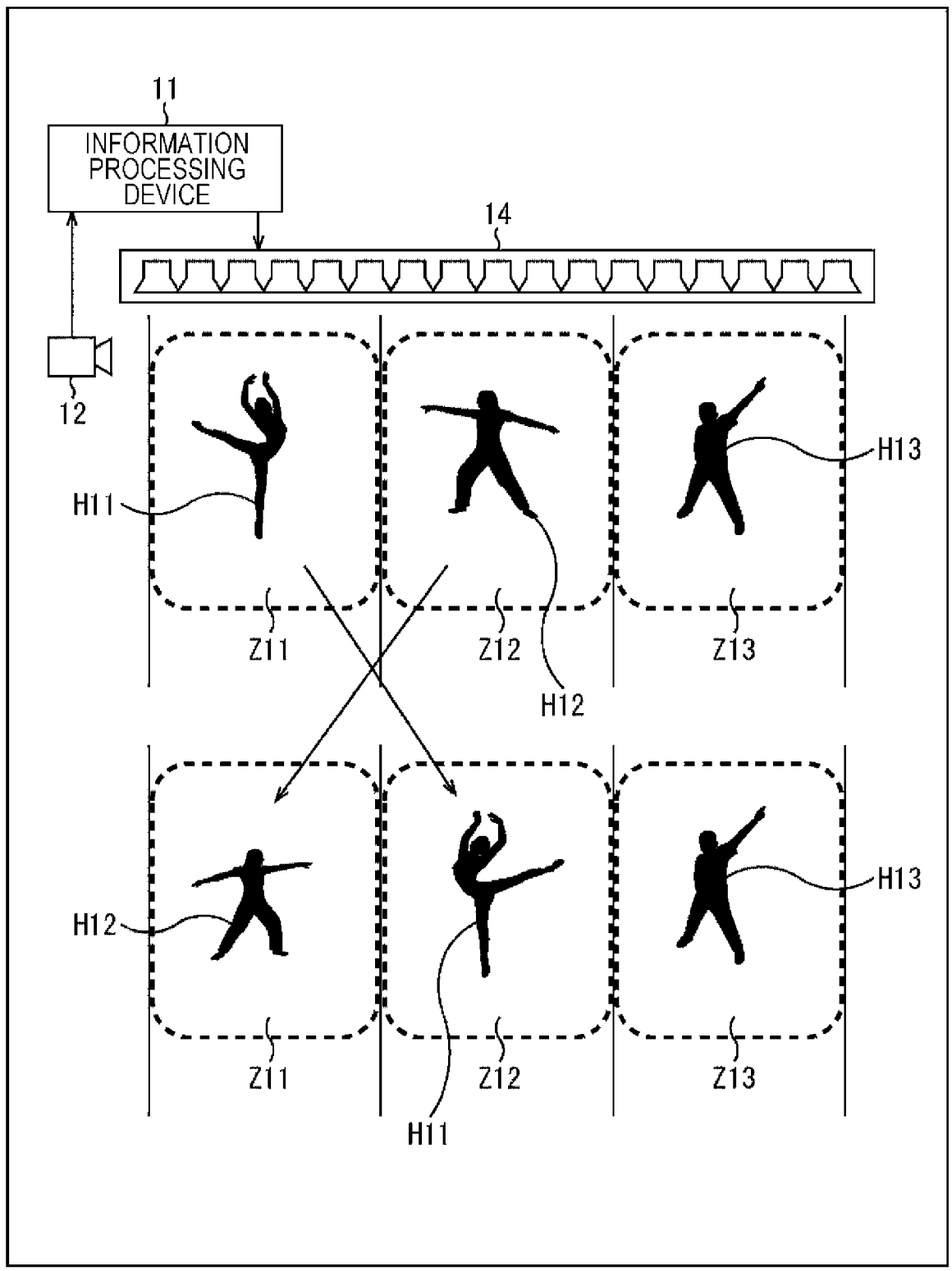
FIG. 16 is a diagram for describing an example of giving individual instructions to a plurality of listeners simultaneously.

In the case of the example of FIG. 15, since the instructions are instructions given to the respective dancers H11 to H13 based on the image captured by the sensor 12, for example, even in a case where there is a change from a state in which the dancer H11 dances in the area Z11, and the dancer H12 dances in the area Z12 as illustrated in an upper portion of FIG. 16 to a state in which the dancer H12 dances in the area Z11, and the dancer H11 dances in the area Z12 as illustrated in a lower portion of FIG. 16, sounds of appropriate instructions are output to the respective dancers H11 and H12.

In other words, the reproduction schedule is generated from the information of the moving speed and the moving direction of the dancers H11 and H12 on the basis of the image captured by the sensor 12, and thus sounds of instructions to be given to the respective dancers H11 and H12 can be switched and output at a timing at which the areas in which the dancers H11 and H12 are located are switched between Z11 and Z12.

Further, although the display unit 13 is not illustrated in FIGS. 15 and 16, in each area of the areas Z11 to Z13 in the studio, the display units 13 which can be viewed by the dancers H11 to H13 dancing in the respective areas may be installed, and images corresponding to instruction contents of individual sounds output through the wave field synthesis may be displayed.

<Output Process in Case where Individual Instructions are Given to Plurality of Listeners Simultaneously>

Figure 17:
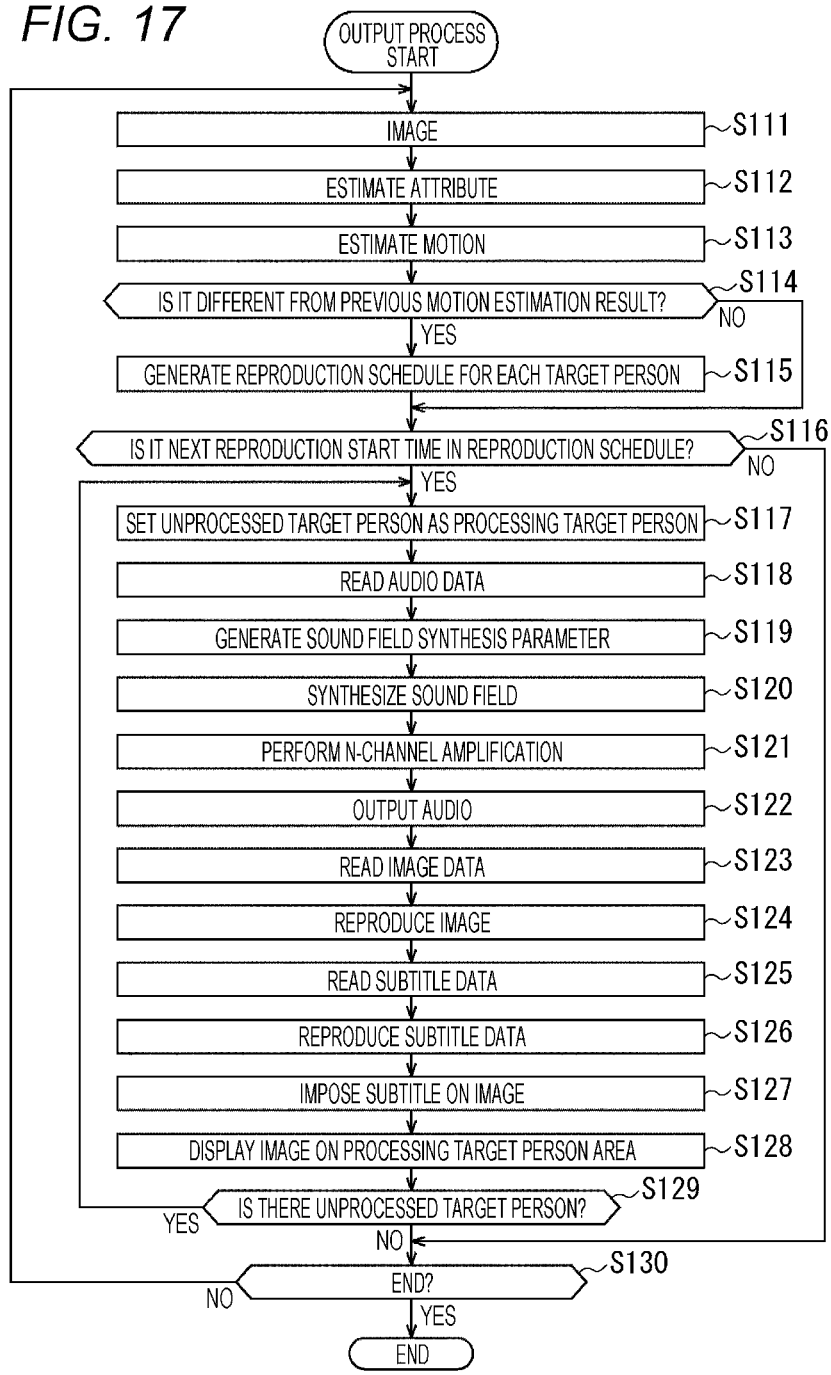
FIG. 17 is a flowchart illustrating an output process in a case where individual instructions are simultaneously given to a plurality of listeners in a fourth embodiment.

Next, an output process in a case where individual instructions are output to a plurality of listeners simultaneously will be described with reference to a flowchart of FIG. 17. Further, in the flowchart of FIG. 17, a process in a case where the display units 13 that display images which can be individually viewed by the dancers dancing in the areas Z11 to Z13 are installed, and images corresponding to respective instruction contents are also displayed will be described.

In step S111, the sensor 12 captures an image of the dance studio in which the dancers are dancing and outputs the image to the audio processing unit 51.

In step S112, the attribute estimating unit 73 of the audio processing unit 51 estimates, as an attribute, a correspondence between each dancer in the image and any one of the dancers H11 to H13 on the basis of the captured image, and outputs an attribute estimation result to the audio data acquiring unit 74 and the image reproducing unit 91 and the subtitle reproducing unit 92 of the image processing unit 52.

In step S113, the motion estimating unit 71 detects the position, the moving speed, and the moving direction of each dancer on the basis of the image captured by the sensor 12, estimates the position of the dancer in the future of a predetermined time as a motion, and outputs a motion estimation result to the reproduction schedule generating unit 72.

In step S114, the reproduction schedule generating unit 72 determines whether or not the supplied motion estimation result of each dancer is different from the immediately previous motion estimation result.

In a case where it is determined in step S114 that it is the first process or the difference with the immediately previous motion estimation result is larger than the predetermined threshold value, and it is different from the immediately previous motion estimation result, the process proceeds to step S115.

In step S115, the reproduction schedule generating unit 72 generates a schedule of causing an appropriately audible sound and an appropriately viewable image to be reproduced for each dancer on the basis of the position at each time on the estimated moving path of the dancer which is the listener on the basis of the motion estimation result. Then, the reproduction schedule generating unit 72 outputs the information of the generated reproduction schedule to the audio data acquiring unit 74, the sound field synthesis parameter generating unit 75, and the image reproducing unit 91 and the subtitle reproducing unit 92 of the image processing unit 52.

In step S116, the control unit 31 determines whether or not it is a next content reproduction start time in the reproduction schedule.

In a case where it is determined in step S116 that it is the next content reproduction start time in the reproduction schedule, the process proceeds to step S117.

In step S117, the control unit 31 sets any one of unprocessed dancers as the processing target person. Hereinafter, the dancer is also referred to as a target person.

In step S118, the audio data acquiring unit 74 accesses the storage unit 34, and acquires the audio data 111 of the instruction content associated with the attribute of the processing target person, that is, information indicating any one of the dancers H11 to H13, and outputs the audio data 111 to the sound field synthesis parameter generating unit 75. Since the attribute includes information identifying the dancer who is the processing target person, the audio data 111 of the content instructed to each identified dancer is read out.

In step S119, the sound field synthesis parameter generating unit 75 generates the sound field synthesis parameter for synthesizing the sound filed in which the sound which can be appropriately heard by the processing target person who is the listener can be output through the wave field synthesis on the basis of the reproduction schedule of the dancer who is the processing target person, and outputs the sound field synthesis parameter to the sound field synthesizing unit 76 together with the audio data 111.

In step S120, the sound field synthesizing unit 76 synthesizes the sound field by synthesizing the audio data 111 for each channel through a convolutional operation on the basis of the sound field synthesis parameter and the audio data 111, and outputs the sound field to the N-channel amplifying unit 77.

In step S121, the N-channel amplifying unit 77 amplifies the audio data 111 synthesized for each channel, and outputs the audio data 111 to each speaker of the multi-speaker system 14 as the sound signal.

In step S122, the multi-speaker system 14 outputs the sound to the position at which the dancer who is the processing target person is located on the basis of the sound signal supplied from the N-channel amplifying unit 77.

In other words, with a series of processes from step S118 to step S122, the sound in which the sound field is synthesized (wave field synthesized) with the instruction content to be given to any one of the dancers H11 to H13 who are the processing target persons is output from the multi-speaker system 14.

In step S123, the image reproducing unit 91 accesses the storage unit 34 and reads the image data 112 of the instruction content associated with the attribute of the processing target person, that is, the information indicating any one of the dancers H11 to H13. The image data 112 of the content instructed to the dancer identified as the processing target person is read out.

In step S124, the image reproducing unit 91 reproduces the read image data 112 and outputs it to the subtitle imposing unit 93.

In step S125, the subtitle reproducing unit 92 accesses the storage unit 34 and reads the subtitle data 113 of the instruction content associated with the attribute of the processing target person, that is, the information indicating any one of the dancers H11 to H13. The subtitle data 113 of the content instructed to the dancer identified as the processing target person is read out.

In step S126, the subtitle reproducing unit 92 reproduces the read subtitle data 113 and outputs it to the subtitle imposing unit 93.

In step S127, the subtitle imposing unit 93 imposes the subtitle on the reproduced image.

In step S128, the subtitle imposing unit 93 outputs the image obtained by imposing the subtitle to the display unit 13 so that the image is displayed.

In step S129, the control unit 31 determines whether or not there is an unprocessed target person (dancer), and in a case where there is an unprocessed target person, the process returns to step S117, and the processing of steps S117 to S129 is repeated until there is no unprocessed target person. Further, in a case where it is determined in step S129 that there is no unprocessed target person, the process proceeds to step S130.

In step S130, it is determined whether or not an end instruction is given, and in a case where no end instruction is given, the process returns to step S111, and the subsequent processes are repeated. Then, in a case where an end instruction is given in step S130, the process ends.

Further, in a case where it is determined in step S116 that it is not the next content reproduction start time in the reproduction schedule, the process of steps S117 to S129 is skipped.

With the above process, it is possible to simultaneously output sounds of individual instructions to a plurality of dancers and display the image.

As a result, a plurality of dancer can perform a group cooperative action by receiving individual instructions and dancing, and it is possible to realize a group cohesive dance.

Further, since it is sufficient as long as a group behavior is specified, it may be used for giving an instruction in actions other than a dance, and for example, an appropriate instruction may be presented to each member by a sound and an image when a team in which a plurality of members cooperate different actions is formed.

5. Modified Example

<Example of Visually Presenting Audible Content to Listener>

The example in which the position, the moving speed, and the moving direction of the listener are recognized to estimate the motion of the listener on the basis of the image captured by the sensor 12, the reproduction schedule of each previously set area or each target person is set on the basis of the motion estimation result, and the audible sound is output to the listener of each area or each target person through the wave field synthesis has been described above, but the audible content may be presented to each area to be visually recognized.

Figure 18:
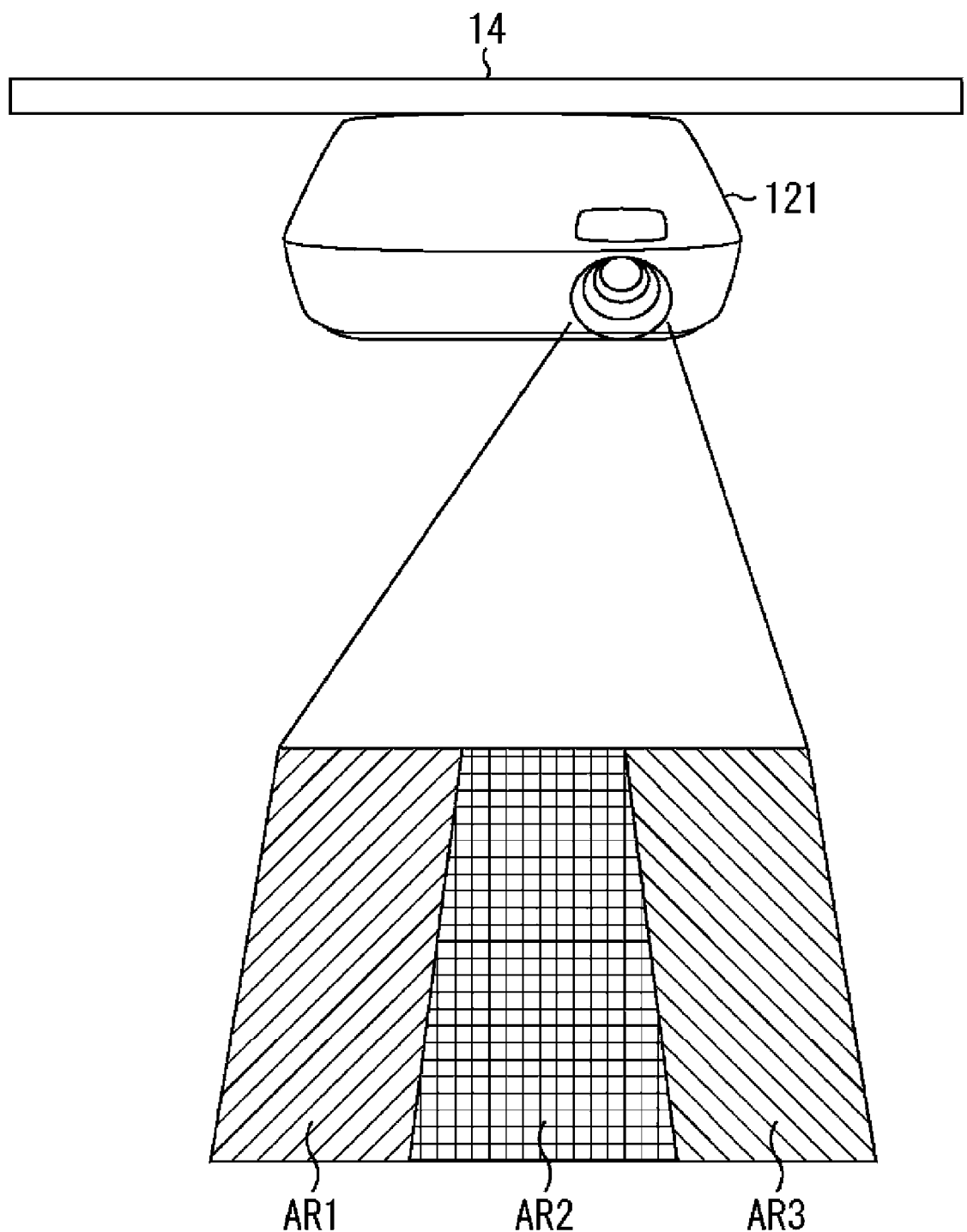
FIG. 18 is a diagram for describing an example of visually presenting listenable content to a listener.

For example, a state in which the multi-speaker system 14 outputs, for example, a sound of Japanese to an audio reproduction area AR1, outputs, for example, a sound of English to an audio reproduction area AR2, and outputs, for example, a sound of Chinese to an audio reproduction area AR3 in accordance with the reproduction schedule as illustrated in FIG. 18 is assumed.

Here, a projector-like area presenting device 121 may be installed above the multi-speaker system 14 so that, for example, patterns or the like which enable respective areas to be recognized as areas in which sound guidance of Japanese, English, and Chinese are output are projected onto floors of areas corresponding to the audio reproduction areas AR1 to AR3.

As a result, the listener can recognize in which area the listener can currently hear the sound of what language.

Figure 19:
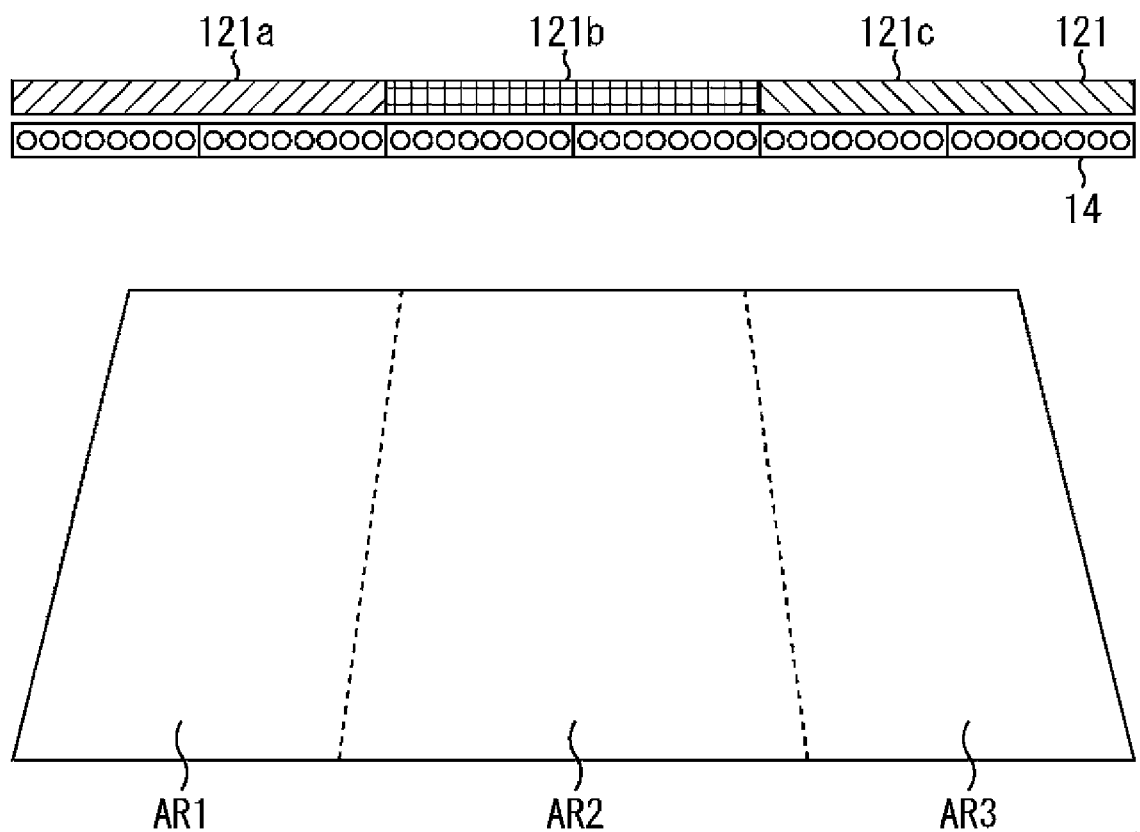
FIG. 19 is a diagram for describing an example of visually presenting listenable content to a listener.

Further, the area presenting device 121 may have other configurations as long as the listener can recognize which language is output at which position, and, for example, as illustrated in FIG. 19, an LED illumination may be arranged above the multi-speaker system 14 in combination with the arrangement of each speaker, and light of a different color may be emitted in each of the audio reproduction areas AR1 to AR3 corresponding to a type in which the language output from the multi-speaker system 14 is output.

For example, as illustrated in FIG. 19, a light of a different color may be emitted in each of areas 121a to 121c in which LEDs constituting the area presenting device 121 are arranged to which the audio reproduction areas AR1 to AR3 correspond so that the areas in which the sounds of different languages are output are visually recognized.

In other words, in this case, the listener can recognize a language in which the sound is output in each of the corresponding audio reproduction areas AR1 to AR3 since each of the areas 121a to 121c of the LEDs constituting the area presenting device 121 emits a color.

Further, in a case where the display unit 13 is installed in association with each area, information corresponding to a language in which the sound is output in a corresponding area may be presented in the corresponding display unit 13.

Further, the operation and the control of the area presenting device 121 may be realized by controlling a projection position or controlling color emission in accordance with a type of audio data supplied to each of the speakers constituting the multi-speaker system 14. Therefore, since the control of the area presenting device 121 is substantially the same as the control of the multi-speaker system 14, description thereof is omitted.

6. Fifth Embodiment

<Output Process Corresponding to Attribute of Listener>

The example of presenting the advertisement including the sound and the image to the pedestrian who is the listener moving on the passage in accordance with the motion or outputting the instructions individually to a plurality of listeners at the same time has been described above, but the output may be performed in accordance with the attribute regardless of the change in the motion or the position of the pedestrian who is the listener.

Here, an output process corresponding to the attribute of the listener will be described with reference to a flowchart of FIG. 20. Further, since the processes of steps S151 to S164 in the flowchart of FIG. 20 are the same as the processes of steps S11, S12, and S17 to S28 in the flowchart of FIG. 6, description of the processes is omitted.

In other words, in the output process described with reference to the flowchart of FIG. 20, in step S152, the presence/absence of a pedestrian, individual identification information of a pedestrian, a male, a female, an age, a nationality, a speaking language, one man, one woman, a group of a plurality of men, a group of a plurality of women, a group of mixed men and women, and a family, a facial expression of a pedestrian, an emotion of a pedestrian, a state of a behavior (including standing still, walking, running, a gesture, or the like), or the like is estimated as the attribute on the basis of images which are repeatedly captured.

Then, in steps S153, S158, and S160, the audio data 111, the image data 112, and the subtitle data 113 based on the attribute estimation result are read and output as the sound from the multi-speaker system 14 and the image from the display unit 13.

Figure 20:
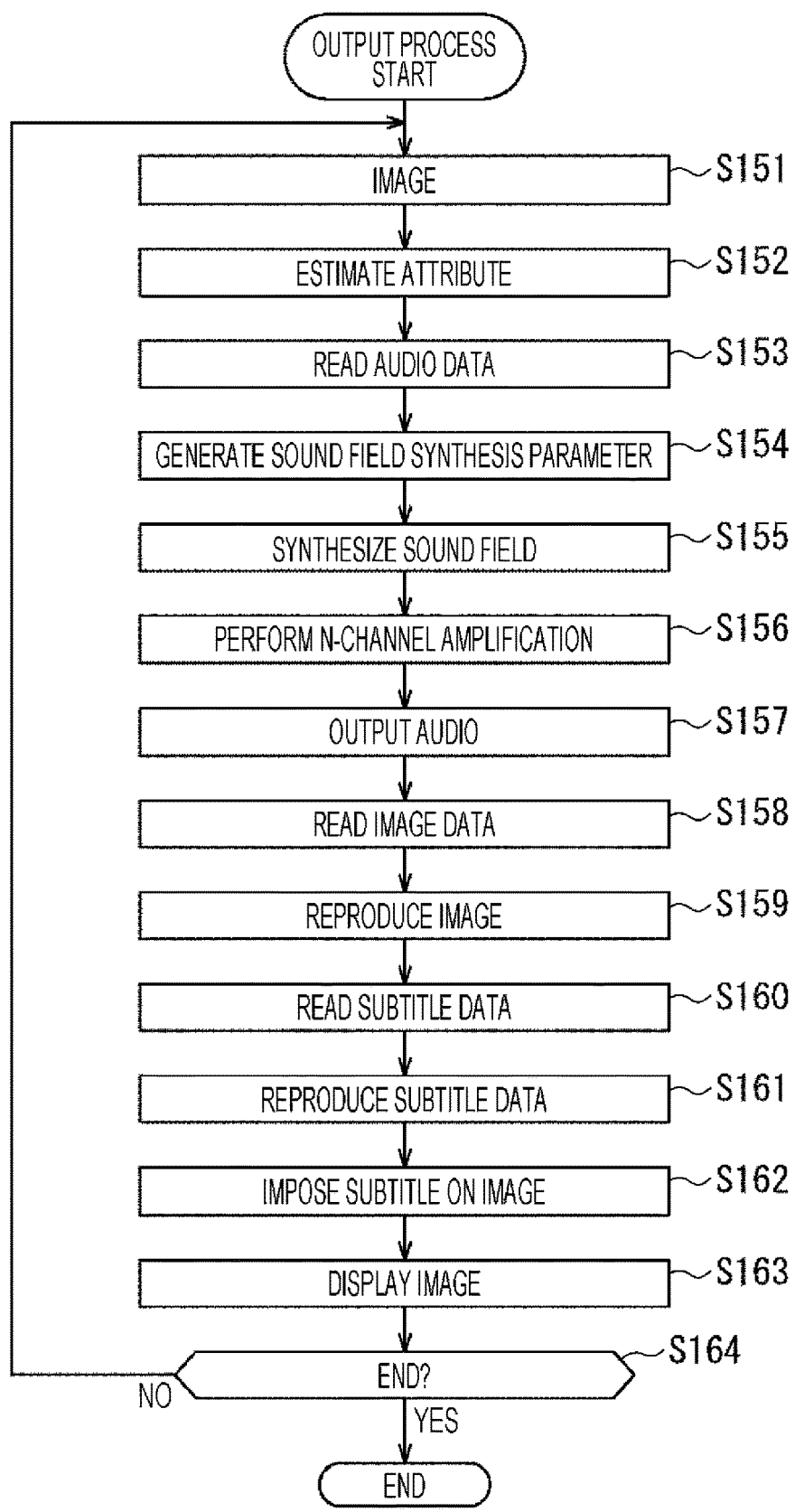
FIG. 20 is a flowchart illustrating an output process according to an attribute of a listener in a fifth embodiment.

However, in the process illustrated in FIG. 20, since the motion of the pedestrian, that is, the estimation result related to the change in the position is unable to be obtained, the sound is output in a case where the sound source is at a specific position, and an operation of following the change in the motion or the position of the pedestrian is not performed.

However, since it is possible to output the content of the sound and the image corresponding to the attribute of the pedestrian, the sound and the image (including the subtitle) presented to the pedestrian who is the listener are the content of the sound and the image (including subtitles) corresponding to the attribute of the pedestrian, and thus it is possible to present an easily acceptable advertisement to the pedestrian who is the listener.

As a result, it is possible to present the advertisement constituted by the sound and the image including an optimum type of content to the pedestrian who is the listener in accordance with the motion of the pedestrian, and thus, it is possible to improve the advertisement effect.

7. Sixth Embodiment

<Example of Reproducing Sound and Image of Live Hall in Reproduction Hall>

The example of presenting the advertisement including the sound and the image to the pedestrian who is the listener moving on the passage in accordance with the motion or outputting the instructions individually to a plurality of listeners at the same time has been described above, but a sound and an image of a live hall may be output in other reproduction halls.

Figure 21:
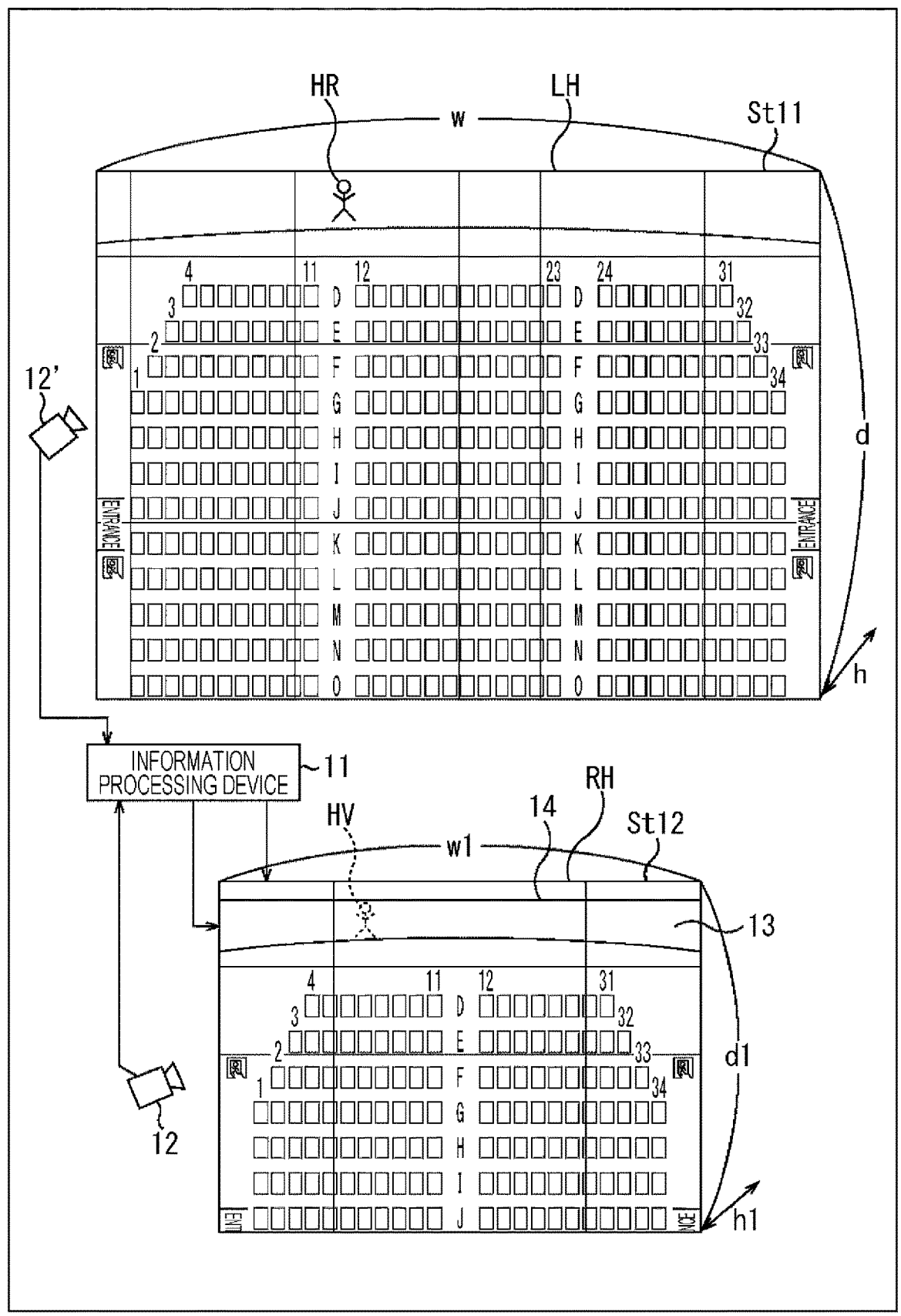
FIG. 21 is a diagram for describing an example of reproducing a sound and an image of a live hall in a reproduction hall.

For example, as illustrated in FIG. 21, a sensor 12' performs imaging (including sound recording) of a live show performed by an artist HR on a stage St11 of a live hall LH, and information of the captured live image and the recorded live sound is transmitted to the information processing device 11. Further, the artist HR can be regarded as a speaker that generates a sound for the listener who hears the sound.

The information processing device 11 acquires the live image and the live sound supplied from the sensor 12'. Further, the information processing device 11 acquires information such as, for example, a building space size (w×d×h) or the number of gathered guests as data specific to the live hall LH, and acquires information such as, for example, a building space size (w1×d1×h1) or the number of gathered guests as data specific to the reproduction hall RH.

Then, the information processing device 11 generates the reproduction schedule of the live image and the live sound in the reproduction hall RH on the basis of a sensing result of the reproduction hall RH, the live image and the live sound which are the sensing result of the live hall LH, the data specific to the live hall LH, and the data specific to the reproduction hall RH, and generates the sound field synthesis parameter corresponding to the reproduction hall RH in accordance with the reproduction schedule.

More specifically, the information processing device 11 estimates the motion of the artist HR in the live hall LH on the basis of the captured image of the live hall LH, and converts a motion estimation result of the artist HR in live hall LH into a motion estimation result in the reproduction hall RH on the basis of the data specific to the live hall LH and the data specific to the reproduction hall RH. The information processing device 11 generates the reproduction schedule of the live image and the live sound in the reproduction hall RH on the basis of the motion estimation result of the artist HR in the reproduction hall RH, and generates the sound field synthesis parameter corresponding to the reproduction hall RH in accordance with the reproduction schedule.

The information processing device 11 performs the wave field synthesizes on the sound recorded in the live hall LH on the basis of the sound field synthesis parameter corresponding to the generated reproduction hall RH, and outputs the sound of the live hall LH as a sound suitable for the reproduction hall RH.

At this time, the information processing device 11 converts a size of the image data obtained in the live hall LH into a size suitable for the display unit 13 installed on the stage St12 of the reproduction hall RH, and displays it as the artist HV.

Accordingly, even in the reproduction hall RH, the live show in the live hall LH is realized by displaying the artist HV as if the artist HR in the live hall LH is located in the reproduction hall RH through the sound and the image heard (viewed) in the live hall LH.

Further, the information processing device 11 may perform imaging (including sound recording) of a situation of audience in the reproduction hall RH through the sensor 12 and acquire an excitement (the sound of the reproduction hall or the like) as the sensing result of the reproduction hall RH.

At this time, the information processing device 11 may also generate the reproduction schedule in the reproduction hall RH in consideration of the motion estimation result of the audience within the reproduction hall RH.

<Hardware Configuration Example of Information Processing Device that Outputs Sound and Image of Live Hall in Reproduction Hall>

Next, a hardware configuration example of the information processing device 11 that outputs the sound and the image of the live hall in the reproduction hall will be described with reference to FIG. 21. Further, in the information processing device 11 of FIG. 21, components having the same functions as those of the information processing device 11 of FIG. 3 are denoted by the same reference numerals, and description thereof will be omitted appropriately.

Figure 3:
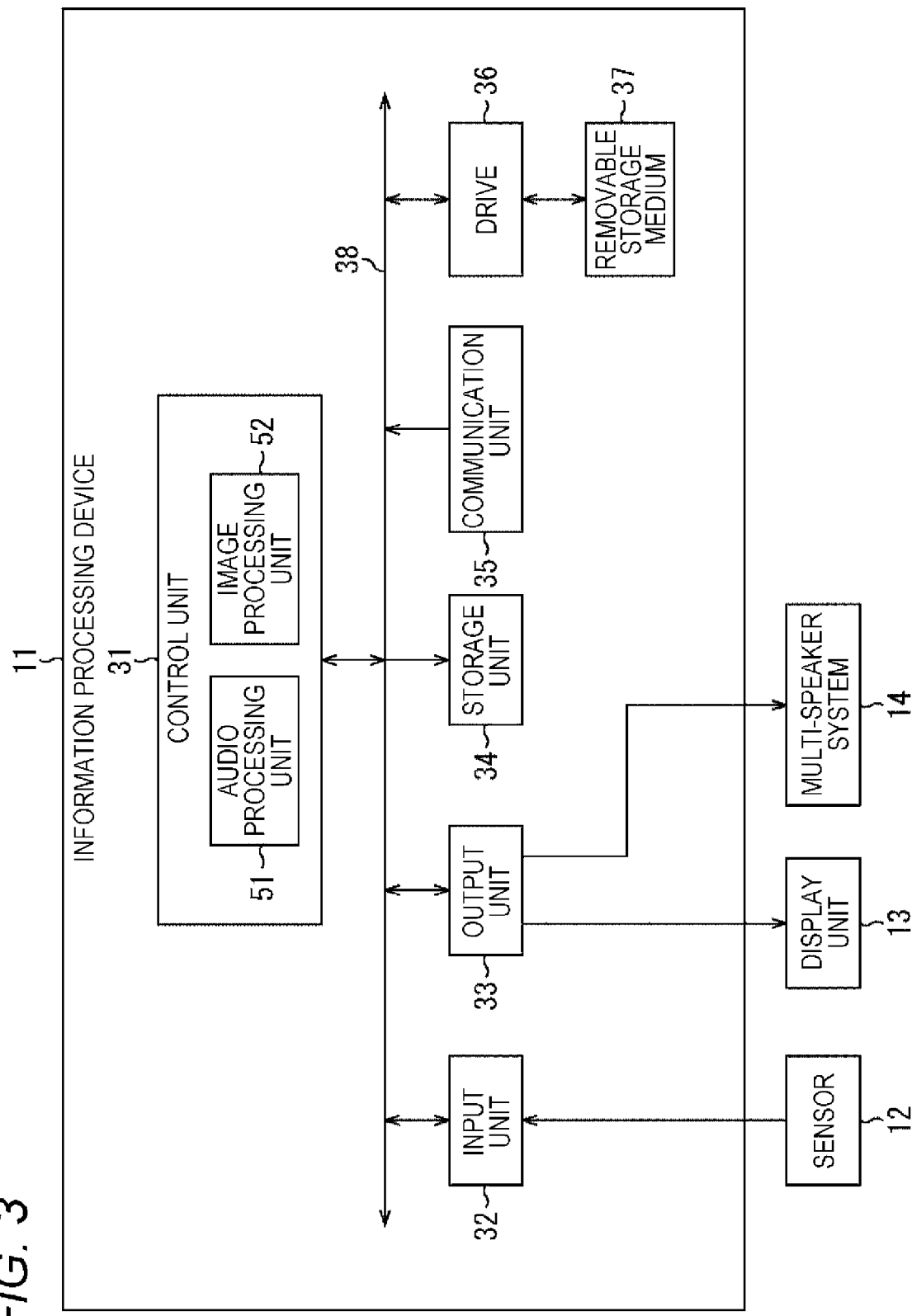
FIG. 3 is a hardware block diagram illustrating a hardware configuration of an information processing device in the advertisement presentation system of FIG. 1.

In other words, the hardware configuration example of the information processing device 11 of FIG. 21 is different from the hardware configuration example of the information processing device 11 of FIG. 3 in that the sensor 12' installed in the live hall LH is newly added. The sensor 12' is installed in the live hall LH, captures the image in the live hall LH, records the sound, and transmits the image and the sound to the information processing device 11.

In the information processing device 11 of FIG. 21, the control unit 31 controls the communication unit 35 such that the image and the sound supplied from the sensor 12' are acquired, and stores audio data 151 (FIG. 22) and image data 152 (FIG. 22) in the storage unit 34.

Figure 22:
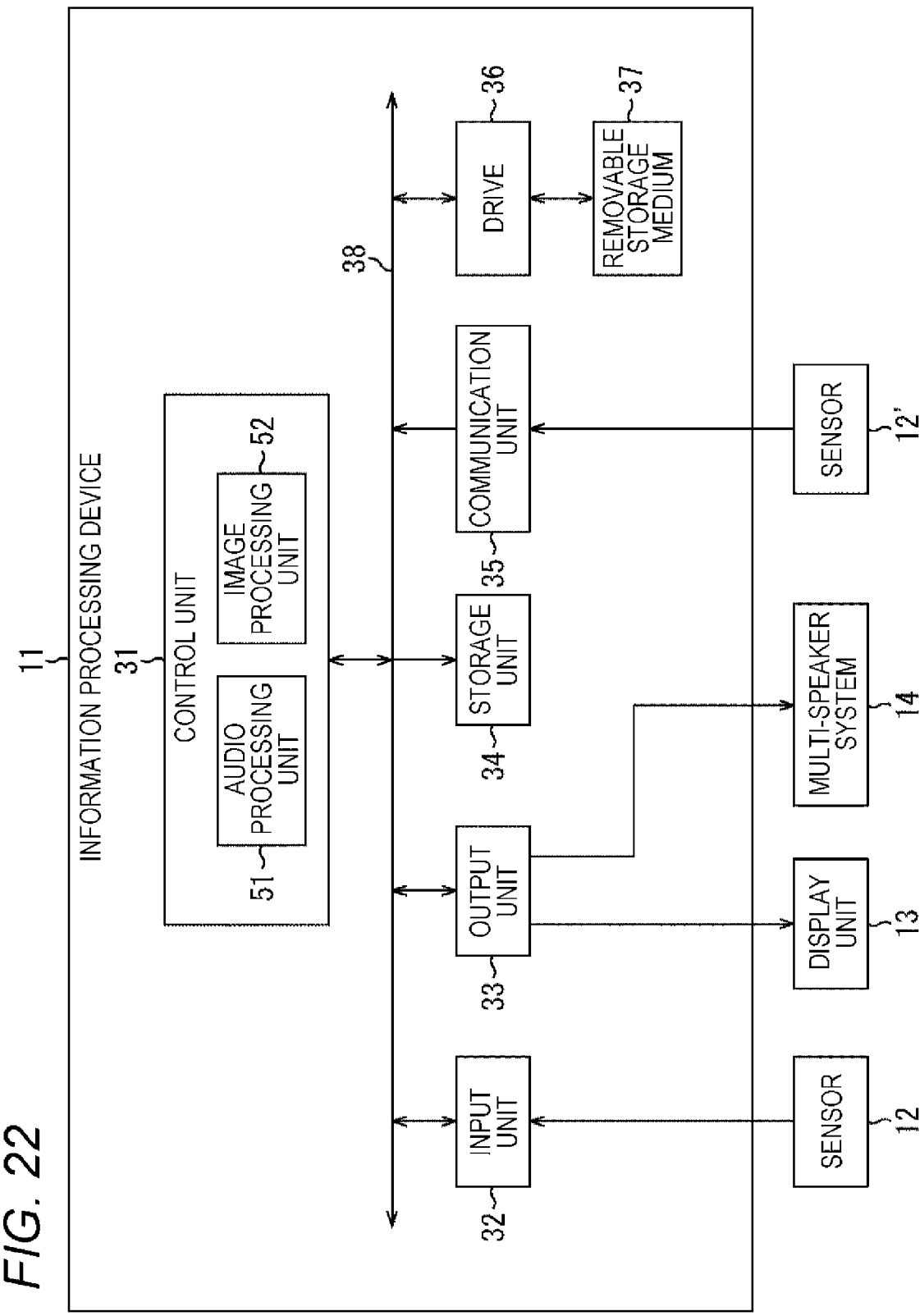
FIG. 22 is a hardware block diagram illustrating a hardware configuration of an information processing device of FIG. 21.

Further, in addition to the image and the sound, the sensor 12' also acquires the subtitle data in a case where there is subtitle data or the like, for example, and transmits the subtitle data to the information processing device 11. In this case, the information processing device 11 acquires the supplied subtitle data and stores the subtitle data in the storage unit 34 as subtitle data 153 (FIG. 22). Further, other information may be acquired as long as it is information which can be sensed, and other information may be sensed, for example, if it is information by which a state of the live hall LH can be recognized such as a humidity or a temperature of the live hall LH.

<Functional Configuration Example Realized by Information Processing Device of FIG. 21>

Next, the functions realized by the information processing device 11 of FIG. 21 will be described with reference to the functional block diagram of FIG. 22. Further, in the functional block diagram of FIG. 22, components having the same function as the functional block diagram of FIG. 4 are denoted by the same reference numerals, and description thereof will be omitted appropriately.

Figure 4:
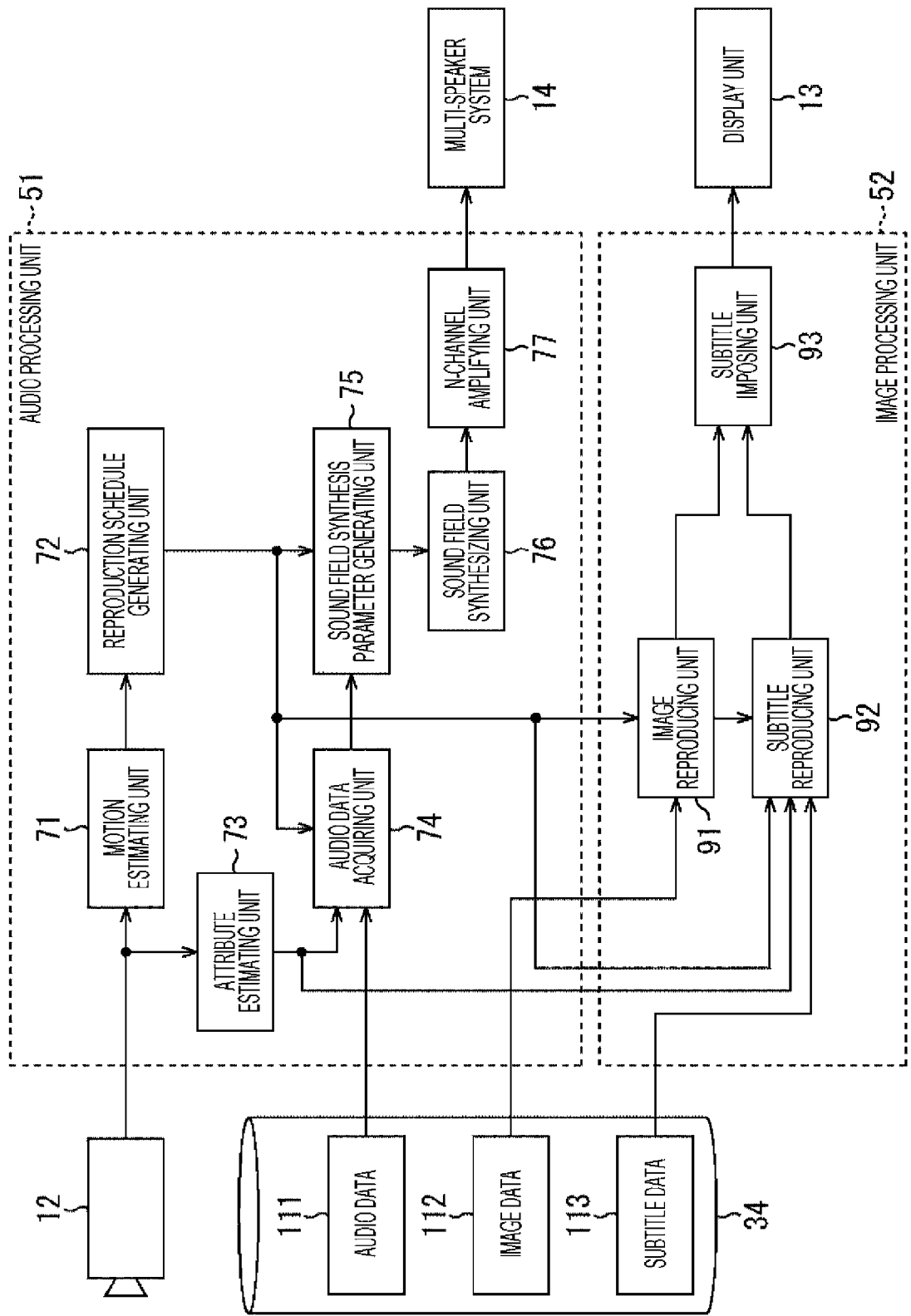
FIG. 4 is a functional block diagram illustrating functions realized by the information processing device of FIG. 3.

In other words, the functional block diagram of FIG. 22 is different from the functional block diagram of FIG. 4 in that, instead of the audio data 111, the image data 112, and the subtitle data 113 stored in the storage unit 34, the audio data 151 of the live sound, the image data 152 of the live image, and the subtitle data 153 presented in the live show which are supplied from the live hall LH are stored as information from the sensor 12'. Further, a difference lies in that spatial information such as live hall-specific data 161 such as the size of live hall LH or the number of gathered guests which is acquired in advance and reproduction hall-specific data 162 such as the size of reproduction hall RH or the number of gathered guests is newly stored.

Further, a motion estimating unit 171, a reproduction schedule generating unit 172, and an image reproducing unit 191 are installed instead of the motion estimating unit 71, the reproduction schedule generating unit 72, and the image reproducing unit 91.

The motion estimating unit 171 detects information of the position, the moving speed, and the moving direction of the artist HR on the basis of the image data 152 which is the image of the live hall LH captured by the sensor 12', and estimates the position of the artist HR in the hall LH in the future of a predetermined time as the motion of the artist HR.

Further, the motion estimating unit 171 estimates the motion of the artist HR in the live hall LH on the basis of the image data 152 which is the image captured in the live hall LH, converts the motion estimation result of the motion in the live hall LH into the motion estimation result in the reproduction hall RH on the basis of the data specific to the live hall LH and the data specific to the reproduction hall RH, and outputs the motion estimation result in the reproduction hall RH to the reproduction schedule generating unit 172.

Figure 23:
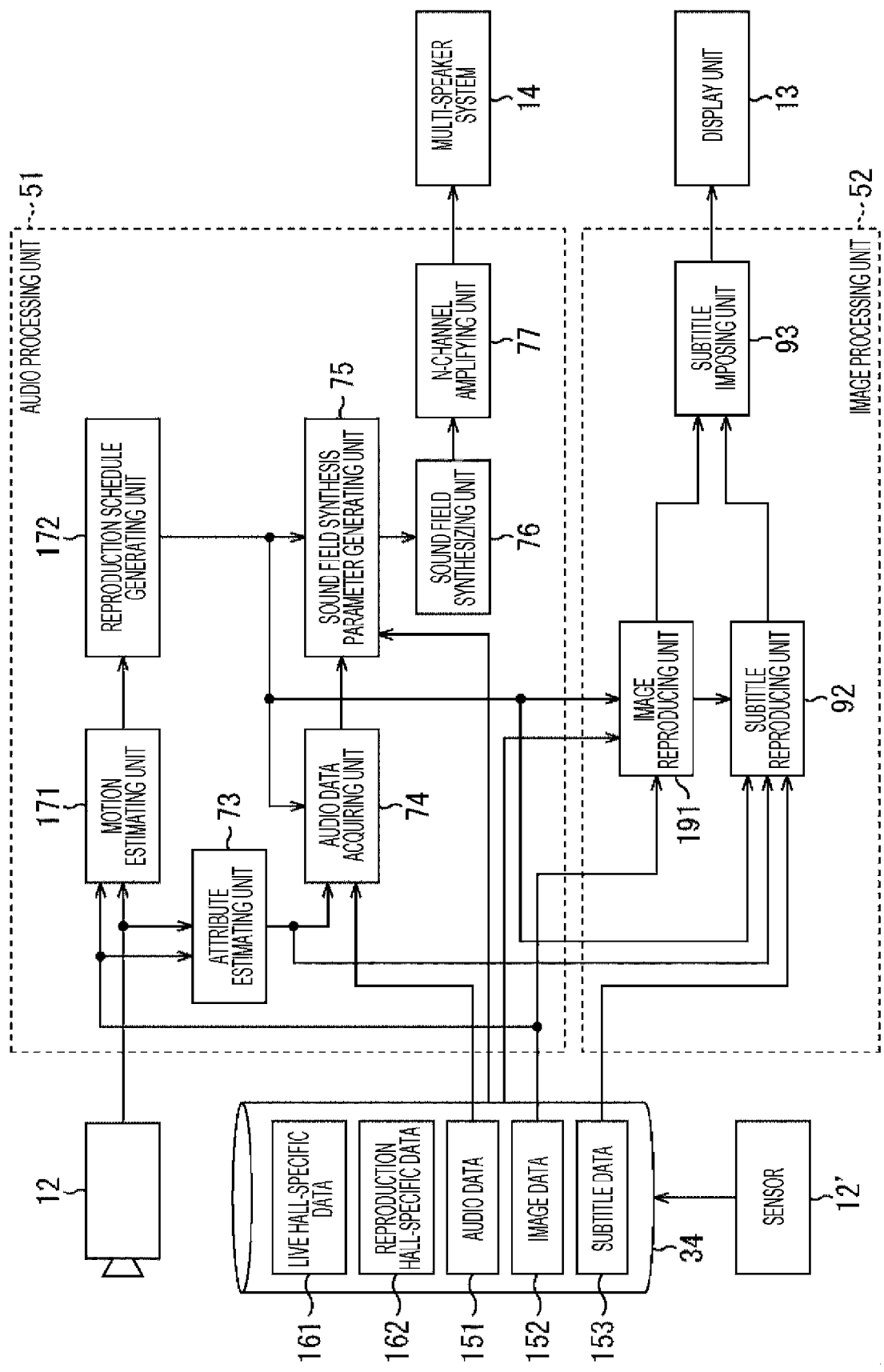
FIG. 23 is a functional block diagram illustrating functions realized by the information processing device of FIG. 22.

More specifically, as illustrated in an upper portion of FIG. 23, the motion estimating unit 171 estimates a position (x, y, z) and motion information (the moving speed and the moving direction) (s, t, u) of the artist HR on the stage St11 of the live hall LH as the motion in the live hall LH.

The motion estimating unit 171 estimates the motion in the reproduction hall RH including a position (x1, y1, z1) and motion information (the moving speed and the moving direction) (s1, t1, u1) on the stage St12 in the reproduction hall RH by mapping the motion in the live hall LH on the basis of the space size (w, d, h) of the live hall LH obtained from the live hall-specific data 161 and a space size (w1, d1, h1) of the reproduction hall RH obtained from the reproduction hall-specific data 162. In other words, the motion estimating unit 171 estimates the motion of the artist HR in the live hall LH on the basis of the image of the live hall LH, and converts it into the motion estimated in a case where the artist HR is located in the reproduction hall RH.

The reproduction schedule generating unit 172 generates a reproduction schedule for reproducing the audio data 151 obtained by the sensor 12' on the basis of the motion estimation result in the reproduction hall RH obtained with reference to FIG. 23, and outputs the reproduction schedule to the sound field synthesis parameter generating unit 75.

At this time, the reproduction schedule generating unit 172 also decides various effects affecting the sound on the basis of the space size (w, d, h) of the live hall LH obtained from the live hall-specific data 161 and the space size (w1, d1, h1) of the reproduction hall RH obtained from the reproduction hall-specific data 162, generates the reproduction schedule while considering the effects as well, and outputs the reproduction schedule to the sound field synthesis parameter generating unit 75.

Further, since the image of the audience in the reproduction hall RH is also captured as the image by the sensor 12, and the sound is also recorded, the motion estimating unit 171 may estimate the motion of the audience in the reproduction hall and a motion in a case where the artist HR is located in the reproduction hall RH and output the estimated motions to the reproduction schedule generating unit 172.

In this case, the reproduction schedule generating unit 172 may generate the reproduction schedule in consideration of the motion of the audience in the reproduction hall and the motion in a case where the artist HR is located in the reproduction hall RH.

Then, the sound field synthesis parameter generating unit 75 generates the sound field synthesis parameter for synthesizing the sound field for outputting the sound through the wave field synthesis on the basis of the reproduction schedule generated for the reproduction hall RH generated as described above.

With a series of processes, it is possible to realize a sound having a realistic feeling similar to that in a case where it is heard in the live hall LH in the reproduction hall RH through the wave field synthesis realized in the multi-speaker system 14 in the reproduction hall RH through the generated sound field synthesis parameter.

Further, the image reproducing unit 191 has a basic function similar to that of the image reproducing unit 91, but the image reproducing unit 191 further converts the image so that the image data 152 including the live image is suitable for the size of the display unit 13 in the reproduction hall RH on the basis of the spatial information based on the live hall-specific data 161 and the reproduction hall-specific data 162, reproduces the image, and outputs the image to the subtitle imposing unit 93.

<Output Process in Case where Sound and Image of Live Hall are Output in Re-Production Hall>

Figure 24:
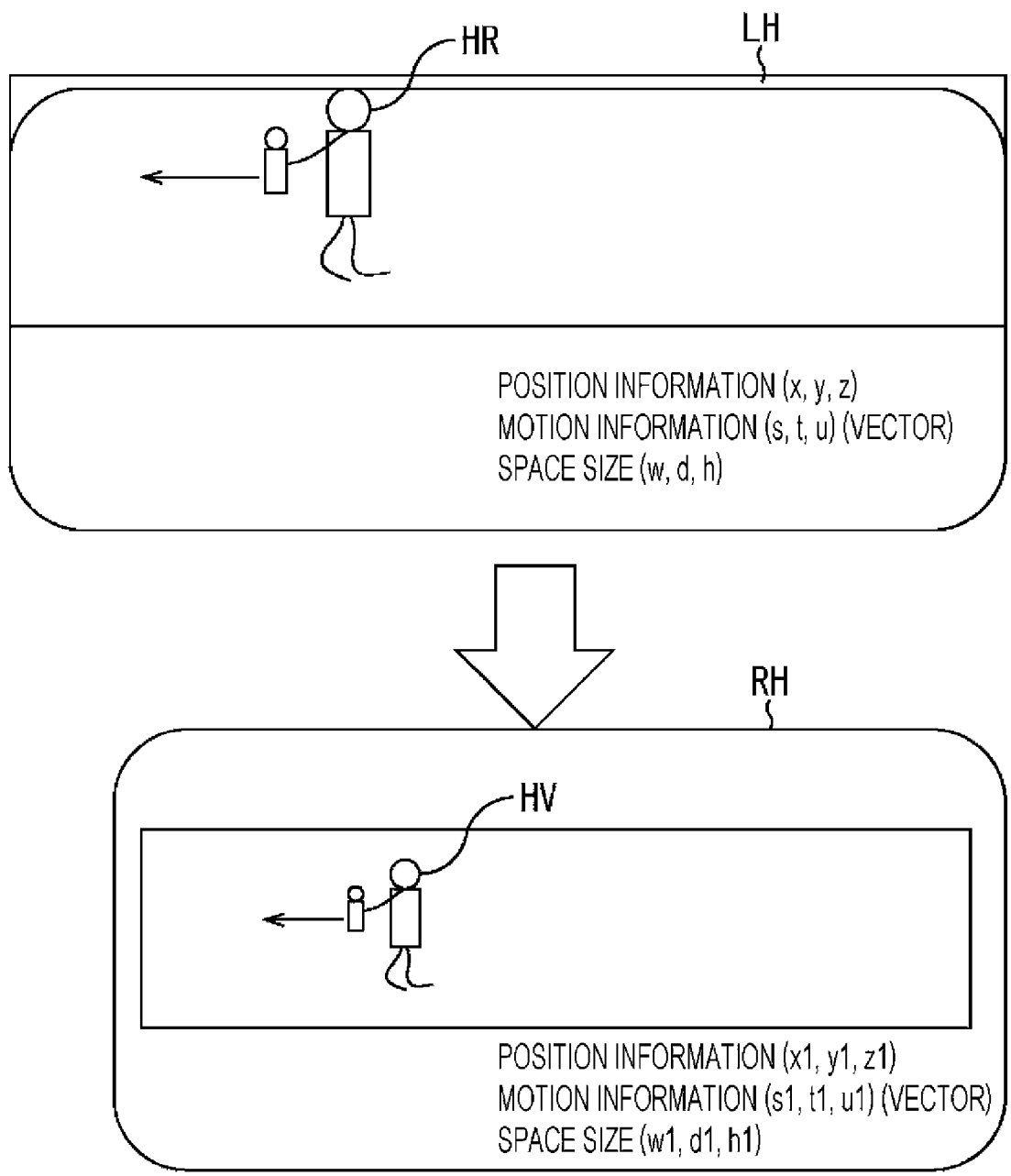
FIG. 24 is a diagram for describing an example of converting a motion estimation result of an artist in a live hall into a motion estimation result in a reproduction hall.

Next, an output process in a case where the sound and the image of the live hall are output in the reproduction hall will be described with reference to a flowchart of FIG. 24.

In step S231, the control unit 31 controls the communication unit 35 such that the live hall-specific data 161 and the reproduction hall-specific data 162 are acquired and stores the live hall-specific data 161 and the reproduction hall-specific data 162 in the storage unit 34. Further, the live hall-specific data 161 and the reproduction hall-specific data 162 may be input in advance, for example, by the user by operating the input unit 32.

In step S232, the control unit 31 controls the communication unit 35 such that the audio data 151 and the image data 152 including the live sound and the live image which are obtained by imaging (including sound recording) by the sensor 12' installed in the live hall LH and transmitted, and stores the audio data 151 and the image data 152 in the storage unit 34. Further, at this time, the control unit 31 may control the communication unit 35 such that the subtitle data 153 is acquired and store the subtitle data 153 in the storage unit 34.

In step S233, the sensor 12 performs imaging in the reproduction hall RH (including sound recording), captures the appearance of the audience, and outputs the image to the audio processing unit 51.

In step S234, the attribute estimating unit 73 of the audio processing unit 51 estimates the attribute of the audience on the basis of the image of the audience in the reproduction hall RH captured by the sensor 12, and outputs the attribute estimation result to the audio data acquiring unit 74 and the image reproducing unit 191 and the subtitle reproducing unit 92 of the image processing unit 52. Further, in this case, for example, information of the attribute of audience may be acquired as information specifying a language when the subtitle is displayed. Further, for the attribute of the audience, an attribute which is largest in number may be set as the attribute of audience among the attributes of the audience instead of the individual attribute of the audience.

In step S235, the motion estimating unit 171 detects the position, the moving speed, and the moving direction of the artist HR on the basis of the image data 152 stored in the storage unit 34, and estimates the position of the artist HR in the live hall LH in the future of a predetermined time as the motion.

In step S236, the motion estimating unit 171 converts the motion estimation result of the artist HR in the live hall LH into the motion estimation result in the reproduction hall RH on the basis of the live hall-specific data 161 and the reproduction hall-specific data 162 as described with reference to FIG. 23 and outputs the motion estimation result in the reproduction hall RH to the reproduction schedule generating unit 72. Further, the motion estimating unit 171 may also obtain the motion estimation result of the audience in the reproduction hall RH captured by the sensor 12 if necessary and output the motion estimation result of the audience to the reproduction schedule generating unit 172.

In step S237, the reproduction schedule generating unit 172 determines whether or not the supplied motion estimation result of the artist HR in the reproduction hall RH is different from the immediately previous motion estimation result.

In a case where it is determined in step S237 that it is the first process or the difference with the immediately previous motion estimation result of the artist HR in the reproduction hall RH is larger than the predetermined threshold value, and it is different from the immediately previous motion estimation result of the artist HR in the reproduction hall RH, the process proceeds to step S238.

In step S238, the reproduction schedule generating unit 172 generates a schedule of causing a sound of a sound source position corresponding to the position of the artist HR to be reproduced at each time on the moving path on the basis of the motion estimation result of the artist HR in the reproduction hall RH. Further, the audio data 151 is regarded as, for example, an audio module constituted by a plurality of frames reproduced at the same sound source position, and information indicating a timing at which the audio module is reproduced or an effect of loading is generated as the reproduction schedule.

Then, the reproduction schedule generating unit 72 outputs the information of the generated reproduction schedule to the audio data acquiring unit 74, the sound field synthesis parameter generating unit 75, and the image reproducing unit 91 and the subtitle reproducing unit 92 of the image processing unit 52.

In step S239, the control unit 31 determines whether or not it is a time at which the next audio module starts to be reproduced in the reproduction schedule.

In a case where it is a time at which the next audio module starts to be reproduced in the reproduction schedule in step S239, the process proceeds to step S240.

In step S240, the audio data acquiring unit 74 accesses the storage unit 34, acquires the audio data 151 including the live sound of the audio module which starts to be reproduced, and outputs the audio data 151 to the sound field synthesis parameter generating unit 75.

In step S241, the sound field synthesis parameter generating unit 75 generates the sound field synthesis parameter for synthesizing the sound field in which the sound for realizing the sound made by the artist HR can be output at the position in the reproduction hall RH corresponding to the live hall LH through the wave field synthesis in the reproduction hall RH through the wave field synthesis, and outputs the sound field synthesis parameter to the sound field synthesizing unit 76 together with the audio data 151 including the live sound.

In step S242, the sound field synthesizing unit 76 synthesizes the sound field by synthesizing the audio data 151 for each channel through a convolutional operation on the basis of the sound field synthesis parameter and the audio data 151 including the live sound, and outputs the sound field to the N-channel amplifying unit 77.

In step S243, the N-channel amplifying unit 77 amplifies the audio data 151 synthesized for each channel, and outputs the audio data 151 to each speaker of the multi-speaker system 14 as the sound signal.

In step S244, the multi-speaker system 14 outputs the sound on the basis of the sound signal supplied from the N-channel amplifying unit 77.

In other words, with a series of processes of steps S239 to S244, the sound field obtained by converting the sound imaged (recorded) in the live hall LH into a state which can appropriately cope with the space of the reproduction hall RH is output from the multi-speaker system 14 as the synthesized (wave field synthesized) sound.

In step S245, the image reproducing unit 191 accesses the storage unit 34 and reads the image data 152 which starts to be reproduced.

In step S246, the image reproducing unit 191 converts a size of the read image data 152 into a size appropriate to the display unit 13 in the reproduction hall RH on the basis of the live hall-specific data 161 and the reproduction hall-specific data 162, reproduces the image data 152, and outputs the image data 152 to the subtitle imposing unit 93.

In step S247, the subtitle reproducing unit 92 accesses the storage unit 34 and reads the subtitle data 153 corresponding to the attribute estimation result which starts to be reproduced. Further, here, as the subtitle data 153, there is subtitle data corresponding to a plurality of languages, and the subtitle data 153 based on the information of the nationality or the speaking language classified as the attribute of the audience is read out.

In step S248, the subtitle reproducing unit 92 reproduces the read subtitle data 153 and outputs the subtitle data 153 to the subtitle imposing unit 93.

In step S249, the subtitle imposing unit 93 imposes the subtitle on the reproduced image.

In step S250, the subtitle imposing unit 93 outputs the image obtained by imposing the subtitle to the display unit 13 so that the display is displayed.

In step S251, it is determined whether or not an end instruction is given, and in a case where no end instruction is given, the process returns to step S232, and the subsequent processes are repeated. Then, in a case where an end instruction is given in step S251, the process ends. Further, in the flowchart of FIG. 24, the example in which the audio data 151, the image data 152, and the subtitle data 153 acquired in the live hall LH are temporarily stored in the storage unit 34 to form a packet, and the reproduction schedule is generated in real time, and it is reproduced has been described, but the audio data 151, the image data 152, and the subtitle data 153 may be stored in advance in the storage unit 34, and the reproduction of the live sound or image in the live hall LH may be performed at a timing different from a timing at which a live concert or the like is being held.

With the above process, even when the audience who is the listener is in the reproduction hall RH having a size different from that of the live hall LH, the reproduction schedule is generated on the basis of the motion estimation result of the artist converted corresponding to the reproduction hall RH, and the sound field synthesis parameter is generated. The wave field synthesis is performed on the audio data 151 including the live sound in accordance with the sound field synthesis parameter, and thus it is possible to output the live sound having a realistic feeling in the reproduction hall RH as if the live sound is heard in the live hall LH.

As a result, the audience in the reproduction hall RH can enjoy a sound having a realistic feeling as if the audience in the live hall LH hears the live sound directly.

8. Example Executed by Software

Meanwhile, a series of processes described above can be executed by hardware and can be executed by software as well. In a case where a series of processes are executed by software, a program constituting the software is installed in a computer incorporated into dedicated hardware, for example, a general-purpose computer capable of executing various types of functions in accordance with various types of installed programs, or the like from a recording medium.

Figure 25:
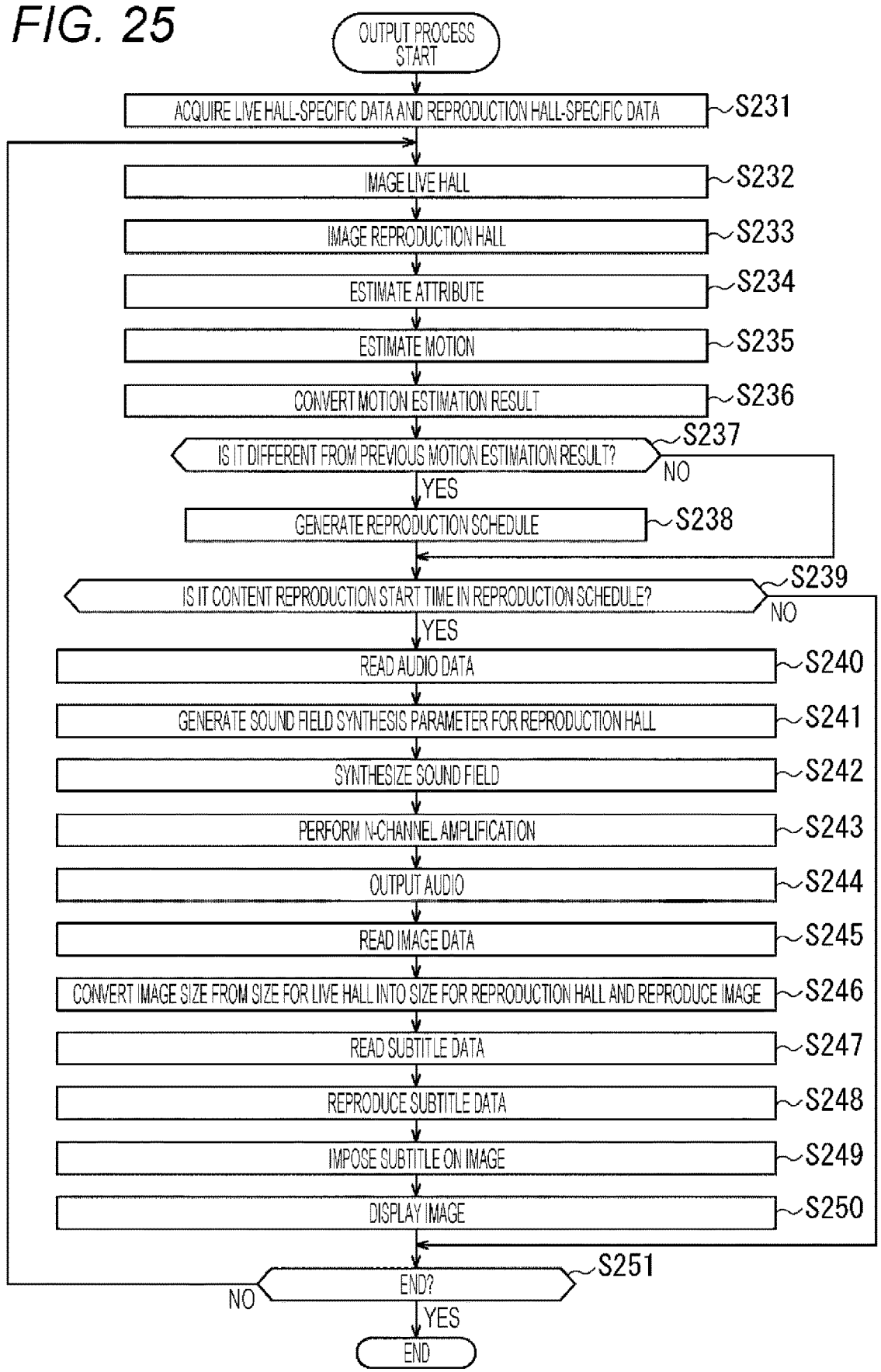
FIG. 25 is a flowchart for describing an output process in a case where a sound and an image of a live hall are reproduced in a reproduction hall in a sixth embodiment.

FIG. 25 shows a configuration example of a general-purpose computer. The personal computer includes an internal central processing unit (CPU) 1001. An input/output interface 1005 is connected to the CPU 1001 via a bus 1004. A read only memory (ROM) 1002 and a random access memory (RAM) 1003 are connected to the bus 1004.

An input unit 1006 including an input device such as a keyboard or a mouse used for the user to input an operation command, an output unit 1007 that outputs a processing operation screen or a processing result image to a display device, a storage unit 1008 that is constituted by a hard disk drive that stores a program or various types of data or the like, and a communication unit 1009 that is constituted by a local area network (LAN) adapter or the like and executes a communication process via a network represented by the Internet are connected to the input/output interface 1005. Further, a drive 1010 that reads or writes data from or in a removable storage medium 1011 such as a magnetic disk (including a flexible disk), an optical disk (including a compact disc-read only memory (CD-ROM) or a digital versatile disc (DVD)), a magneto-optical disk (including a mini disc (MD)), or a semiconductor memory is connected.

The CPU 1001 executes various types of processes in accordance with a program which is stored in the ROM 1002 or a program which is read from the program removable storage medium 1011 such as a magnetic disk, an optical disk, a magneto-optical disk, or a semiconductor memory, installed in the storage unit 1008, and loaded from the storage unit 1008 onto the RAM 1003. Data or the like necessary for the CPU 1001 to execute various types of processes is also stored in the RAM 1003 appropriately.

In the computer having the above configuration, when the CPU 1001 loads, for example, the program stored in the storage unit 1008 onto the RAM 1003 via the input/output interface 1005 and the bus 1004 and executes the program, a series of processes described above is performed.

For example, the program executed by computer (CPU 1001) can be provided in a form in which it is recorded in the removable storage medium 1011 as a package medium or the like. Further, the program can be provided via a wired or wireless transmission medium such as a local area network, the Internet, or digital satellite broadcasting.

In the computer, as the removable storage medium 1011 is loaded into the drive 1010, the program can be installed in the storage unit 1008 via the input/output interface 1005. Further, the program can be received by the communication unit 1009 via a wired or wireless transmission medium and installed in the storage unit 1008. Further, the program can be installed in the ROM 1002 or the storage unit 1008 in advance.

Further, the program executed by the computer may be a program in which the processes are chronologically performed in accordance with the order described in this specification or may be a program in which the processes are executed in parallel or a necessary timing such as when calling is performed.

Further, the CPU 1001 of FIG. 25 realizes the functions of the control unit 31 in FIGS. 3 and 21.

Further, in this specification, a system means a set of a plurality of constituent elements (devices, modules (parts), or the like), and all constituent elements need not necessarily be in the same housing. Accordingly, a plurality of devices which are housed in separate housings and connected via a network and a single device housing a plurality of modules in a single housing are both systems.

Further, the present disclosure is not limited to the above-described embodiments, and various modifications can be made within the scope not deviating from the gist of the present disclosure.

For example, the present disclosure can have a configuration of cloud computing in which one function is shared and cooperatively processed by a plurality of devices via a network.

Further, steps described in the above-described flowchart can be executed by a single device or may be shared and executed by a plurality of devices.

Further, in a case where a plurality of processes are included in one step, a plurality of processes included in one step can be executed by one device or may be shared and executed by a plurality of devices.

Further, the present disclosure can also have the following configurations.

<1> An information processing device, including:
an attribute estimating unit that estimates an attribute of a person; and
an audio output unit that sets content corresponding to the attribute of the person estimated by the attribute estimating unit and outputs a sound through wave field synthesis so that a sound field of the set content is spatially transmitted.

<2> The information processing device according to <1>, further including:
a sound field synthesis parameter generating unit that generates a sound field synthesis parameter for synthesizing the sound field; and
a sound field synthesizing unit that synthesizes the sound field by synthesizing the sound field synthesis parameter and audio data of a plurality of channels for each channel through a convolutional operation,
in which the audio output unit outputs the sound through the wave field synthesis by outputting a sound with which the sound field is synthesized for each channel by the sound field synthesizing unit.

<3> The information processing device according to <2>, in which the person is a listener,
the attribute estimating unit estimates an attribute of the listener,
the information processing device further includes a detecting unit that detects a change in a position of the listener, and
the audio output unit sets content corresponding to the attribute of the listener detected by the attribute estimating unit, changes a position of a virtual sound source in accordance with the change in the position of the listener detected by the detecting unit, and outputs the sound through the wave field synthesis so that a spatial sound field is transmitted.

<4> The information processing device according to <3>, in which a listening area in which the sound is heard by the listener is set as a plurality of divisional areas which are divided, and
the audio output unit sets the content corresponding to the attribute of the listener estimated by the attribute estimating unit, and outputs the sound through the wave field synthesis in a divisional area in which the listener is located among the divisional areas on the basis of the change in the position detected by the detecting unit.

<5> The information processing device according to <4>, further including, a table
that stores a wave field synthesis filter in a case where the listener is located at each position in the divisional area,
in which the audio output unit sets the content corresponding to the attribute of the listener estimated by the attribute estimating unit, reads a wave field synthesis filter corresponding to the position in the divisional area from the table, and outputs the sound through the wave field synthesis.

<6> The information processing device according to <4>, further including, an area presenting unit that presents visual information corresponding to a type of content to be output from the audio output unit to the divisional area.

<7> The information processing device according to <6>, in which the area presenting unit is a projecting unit that projects a different pattern for each divisional area in accordance with the type of content to be output from the audio output unit to the divisional area or a light emitting unit that changes a color for each divisional area in accordance with the type of content to be output to the divisional area and emits light.

<8> The information processing device according to <7>, in which, in a case where there is a large number of types of attributes of the listener estimated by the attribute estimating unit, the audio output unit sets content common to a plurality of attributes, and outputs the sound through the wave field synthesis in a divisional area in which the listener is located among the divisional areas.

<9> The information processing device according to any one of <3> to <8>, further including,
a display unit that reproduces and displays an image corresponding to the sound; and
a subtitle reproducing unit that reproduces a subtitle corresponding to the sound, in which the subtitle reproducing unit selects and reproduces a subtitle corresponding to the attribute of the listener estimated by the attribute estimating unit.

<10> The information processing device according to any one of <3> to <8>, in which the attribute is information recognized by at least one of the image or the sound.

<11> The information processing device according to <10>, in which the information recognized by at least one of the image or the sound is information of the presence or absence of the listener.

<12> The information processing device according to any one of <3> to <8>, in which the attribute is an analysis result of at least one of the image or the sound.

<13> The information processing device according to <12>, in which the analysis result of at least one of the image or the sound includes information indicating individual identification information of the listener, a male, a female, an age, a nationality, a speaking language, one man, one woman, a group of a plurality of men, a group of a plurality of women, a group of mixed men and women, and information indicating whether or not the listener is with family and a facial expression of the listener, an emotion estimated from the facial expression of the listener, and a state of a behavior of the listener.

<14> The information processing device according to any one of <3> to <8>, in which the attribute is information used in non-verbal cues.

<15> The information processing device according to <14>, in which the information used in the non-verbal cues includes a facial expression, a facial color, a line of sight, a body gesture, a hand gesture, a body posture, how to put a physical distance with a counterpart, clothes, a hair style, breathing, a voice tone, or a voice quality.

<16> The information processing device according to any one of <3> to <8>, in which the audio output unit outputs the sound through the wave field synthesis by controlling a volume using a volume curve corresponding to a distance between the listener and a sound source in accordance with the change in the position of the listener detected by the detecting unit.

<17> An information processing method, including:
an attribute estimation process of estimating an attribute of a person; and
a sound output process of setting content corresponding to the attribute of the person estimated in the attribute estimation process and outputting a sound through wave field synthesis so that a sound field of the set content is spatially transmitted.

<18> A program causing a computer to function as:
an attribute estimating unit that estimates an attribute of a person; and
an audio output unit that sets content corresponding to the attribute of the person estimated by the attribute estimating unit and outputs a sound through wave field synthesis so that a sound field of the set content is spatially transmitted.

<19> An information processing system, including:
an attribute estimating unit that estimates an attribute of a person; and
an audio output unit that sets content corresponding to the attribute of the person estimated by the attribute estimating unit and outputs a sound through wave field synthesis so that a sound field of the set content is spatially transmitted.

<20> An information processing device, comprising:
circuitry that:
estimates an attribute of a first person located in at least one of a plurality of areas; and sets a first content corresponding to the attribute of the first person and outputs a sound through wave field synthesis so that a sound field of the set first content is spatially transmitted to at least the one of the plurality of areas via a plurality of speakers.

<21> The information processing device according to <20>, wherein the circuitry: determines an attribute of a second person in another of the plurality of areas and sets a second content corresponding to the attribute of the second person, and outputs a sound through wave field synthesis so that a sound field of the second content is spatially transmitted to the other of the plurality of areas via the plurality of speakers.

<22> The information processing device according to <21>, wherein the first content and the second content are transmitted simultaneously.

<23> The information processing device according to <21> or <22>, wherein the circuitry prioritizes transmission of the first content over transmission of the second content when the first person and the second person are in a same area of the plurality of areas.

<24> The information processing device according to <23>, wherein transmission of the first content is prioritized over transmission of the second content based on a language of the first content and a language of the second content.

<25> The information processing device according to <24>, wherein the language of the first content is English and the language of the second content is Japanese or Chinese.

<26> The information processing device according to any one of <20> to <25>, wherein the circuit:
generates a sound field synthesis parameter for synthesizing the sound field, synthesizes the sound field by synthesizing the sound field synthesis parameter and audio data of a plurality of channels for each channel through a convolutional operation, and
outputs the sound through the wave field synthesis by outputting a sound with which the sound field is synthesized for each channel.

<27> The information processing device according to <26>, wherein the first person is a listener, and
the circuitry:
estimates an attribute of the listener,
detects a change in a position of the listener,
sets content corresponding to the attribute of the listener detected, and
changes a position of a virtual sound source in accordance with the change in the position of the listener detected and outputs the sound through the wave field synthesis so that a spatial sound field is transmitted via the plurality of speakers.

<28> The information processing device according to any one of <20> to <27>, wherein the circuitry:
stores a table including a wave field synthesis filter in a case where the listener is located in each of the plurality of areas,
sets content corresponding to the attribute of the listener, reads a wave field synthesis filter corresponding to the position in the plurality of areas from the table, and outputs the sound through the wave field synthesis.

<29> The information processing device according to any one of <20> to <28>, wherein the circuitry presents visual information corresponding to a type of content to be output to the one of the plurality of areas.

<30> The information processing device according to <29>, wherein the circuitry projects a different pattern for each area of the plurality of areas in accordance with the type of content to be output to a corresponding area.

<31> The information processing device according to <29> or <30>, wherein the circuitry emits light to change a color of each area of the plurality of areas in accordance with the type of content to be output to a corresponding area.

<32> The information processing device according to <30> or <31>, wherein, in a case where there is a plurality of attributes estimated for the first person, the circuitry sets content common to at least a subset of the plurality of attributes, and outputs the content through wave field synthesis in an area of the plurality of areas in which the first person is located.

<33> The information processing device according to <27>, wherein the circuitry:
reproduces and displays an image corresponding to the sound,
reproduces a subtitle corresponding to the sound, and
selects and reproduces a subtitle corresponding to the attribute of the listener.

<34> The information processing device according to <27> or <33>, wherein the attribute is information recognized by at least one of an image or the sound.

<35> The information processing device according to <34>, wherein the information recognized by at least one of the image or the sound is information of a presence or absence of the listener.

<36> The information processing device according to <27>, <33>, or <34>, wherein the attribute is an analysis result of an image.

<37> The information processing device according to <27> or any one of <33> to <36>, wherein the attribute is an analysis result of the sound.

<38> The information processing device according to <36>, wherein the analysis result of the image includes at least one of information indicating individual identification information of the listener, a male, a female, an age, a nationality, one man, one woman, a group of a plurality of men, a group of a plurality of women, a group of mixed men and women, and information indicating whether or not the listener is with family and a facial expression of the listener, an emotion estimated from the facial expression of the listener, or a state of a behavior of the listener.

<39> The information processing device according to <37>, wherein the analysis result of the sound includes a speaking language.

<40> The information processing device according to <27> or any one of <33> to <37>, wherein the attribute is information used in non-verbal cues.

<41> The information processing device according to <39>, wherein the information used in the non-verbal cues includes at least one of a facial expression, a facial color, a line of sight, a body gesture, a hand gesture, a body posture, how to put a physical distance with a counterpart, clothes, a hair style, breathing, a voice tone, or a voice quality.

<42> The information processing device according to <27> or any one of <33> to <37>, wherein the circuitry outputs the sound through the wave field synthesis by controlling a volume using a volume curve corresponding to a distance between the listener and the plurality of speakers in accordance with the change in the position of the listener.

<43> The information processing device according to <21>, wherein in a case that the first content ends and the first person continues to be located in the one of the plurality of areas, the circuitry outputs a sound through wave field synthesis so that a sound field of a third content is spatially transmitted to the one of the plurality of areas via the speakers.

<44> The information processing device according to <22>, wherein the first content and the second content are different.

<45> An information processing method, comprising:
estimating, with circuitry, an attribute of a first person located in at least one of a plurality of areas;
setting, with the circuitry, a first content corresponding to the attribute of the first person; and
outputting a sound through wave field synthesis so that a sound field of the set first content is spatially transmitted to at least the one of the plurality of areas via a plurality of speakers.

<46> A non-transitory computer-readable medium encoded with computer-readable instructions that, when executed by a computer, cause the computer to perform a method comprising:
estimating an attribute of a first person located in at least one of a plurality of areas;
setting a first content corresponding to the attribute of the first person; and
outputting a sound through wave field synthesis so that a sound field of the set first content is spatially transmitted to at least the one of the plurality of areas via a plurality of speakers.

<47> An information processing system, comprising:
circuitry that:
estimates an attribute of a first person located in at least one of a plurality of areas, sets a first content corresponding to the attribute of the first person, and
outputs a sound through wave field synthesis so that a sound field of the set first content is spatially transmitted to at least the one of the plurality of areas via a plurality of speakers.

REFERENCE SIGNS LIST

1 Advertisement presentation system
11 Information processing device
12, 12' Sensor
13, 13-1 to 13-3 Display unit
14 Multi-speaker system
31 Control unit
32 Input unit
33 Output unit
34 Storage unit
35 Communication unit
36 Drive
37 Removable storage medium
38 Bus
51 Audio processing unit
52 Image processing unit
71 Motion estimating unit
72 Reproduction schedule generating unit
73 Attribute estimating unit
74 Audio data acquiring unit
75 Sound field synthesis parameter generating unit
76 Sound field synthesizing unit
77 N-channel amplifying unit
91 Image reproducing unit
92 Subtitle reproducing unit
93 Subtitle imposing unit
111 Audio data
112 Image data
113 Subtitle data
121 Area presenting device
151 Audio data
152 Image data
153 Subtitle data
161 Live hall-specific data
162 Reproduction hall-specific data
171 Motion estimating unit
172 Reproduction schedule generating unit

The invention claimed is:

1. An information processing device, comprising:
processing circuitry configured to:
estimate a first attribute of a first person located in at least one of a plurality of areas,
measure a first location or a movement of the first person,
estimate a second location of the first person after a predetermined time based on the first location or the movement of the first person,
set a first content corresponding to the first attribute of the first person and output a first sound through wave field synthesis so that a first sound field of the first content is spatially transmitted to the second location of the first person after the predetermined time via a plurality of speakers,
estimate a second attribute of a second person in another area of the plurality of areas and set a second content corresponding to the second attribute of the second person,
output a second sound through wave field synthesis so that a second sound field of the second content is spatially transmitted to the another area via the plurality of speakers, and
when the first person and the second person are in a same area of the plurality of areas, prioritize transmission of one of the first content and the second content to the same area and output one sound of the first sound and the second sound according to a predetermined order of priority of the first content and the second content so that a sound field of the one of the first content and the second content is spatially transmitted to the same area,
wherein a first virtual position of a first virtual sound source of the first sound is set based on a location of the first person and the movement of the first person and
a second virtual position of a second virtual sound source of the second sound is set based on a location of the second person.

2. The information processing device according to claim 1, wherein the first content and the second content are transmitted simultaneously.

3. The information processing device according to claim 2, wherein the first content and the second content are different.

4. The information processing device according to claim 1, wherein in a case that the first content ends and the first person continues to be located in the one of the plurality of areas, the processing circuitry is configured to output a third sound through wave field synthesis so that a sound field of a third content is spatially transmitted to the one of the plurality of areas via the speakers.

5. The information processing device according to claim 1, wherein transmission of the first content is prioritized over transmission of the second content based on a language of the first content and a language of the second content.

6. The information processing device according to claim 5, wherein the language of the first content is English and the language of the second content is Japanese or Chinese.

7. The information processing device according to claim 1, wherein the processing circuitry is further configured to:
generate a sound field synthesis parameter for synthesizing the first sound field,
synthesize the first sound field by synthesizing the sound field synthesis parameter and audio data of a plurality of channels for each channel through a convolutional operation, and
output the first sound through the wave field synthesis by outputting a sound with which the first sound field is synthesized for each channel.

8. The information processing device according to claim 7, wherein the first person is a listener, and
the processing circuitry is further configured to:
estimate an attribute of the listener,
detect a change in a location of the listener,
set content corresponding to the attribute of the listener detected, and
change the first virtual position of the first virtual sound source in accordance with the change in the location of the listener detected and output the first sound through the wave field synthesis so that a spatial sound field of the first content is transmitted via the plurality of speakers.

9. The information processing device according to claim 8, wherein the processing circuitry is further configured to:
reproduce and display an image corresponding to the sound,
reproduce a subtitle corresponding to the sound, and
select and reproduce the subtitle corresponding to the attribute of the listener.

10. The information processing device according to claim 8, wherein the attribute is information recognized by at least one of an image or a recorded sound.

11. The information processing device according to claim 10, wherein the information recognized by at least one of the image or the recorded sound is information of a presence or absence of the listener.

12. The information processing device according to claim 8, wherein the attribute is an analysis result of an image.

13. The information processing device according to claim 12, wherein the analysis result of the image includes at least one of information indicating individual identification information of the listener, a male, a female, an age, a nationality, one man, one woman, a group of a plurality of men, a group of a plurality of women, a group of mixed men and women, information indicating whether or not the listener is with family and a facial expression of the listener, an emotion estimated from the facial expression of the listener, or a state of a behavior of the listener.

14. The information processing device according to claim 8, wherein the attribute is an analysis result of a recorded sound.

15. The information processing device according to claim 14, wherein the analysis result of the recorded sound includes a speaking language.

16. The information processing device according to claim 8, wherein the attribute is information used in non-verbal cues.

17. The information processing device according to claim 16, wherein the information used in the non-verbal cues includes at least one of a facial expression, a facial color, a line of sight, a body gesture, a hand gesture, a body posture, how to put a physical distance with a counterpart, clothes, a hair style, breathing, a voice tone, or a voice quality.

18. The information processing device according to claim 8, wherein the processing circuitry is configured to output the sound through the wave field synthesis by controlling a volume using a volume curve corresponding to a distance between the listener and the plurality of speakers in accordance with the change in the location of the listener.

19. The information processing device according to claim 1, wherein the processing circuitry is further configured to:
store a table including a wave field synthesis filter in a case where the first person is located in each of the plurality of areas,
set the first content corresponding to the first attribute of the first person, read a wave field synthesis filter corresponding to the location of the first person in the plurality of areas from the table, and output the first sound through the wave field synthesis.

20. The information processing device according to claim 1, wherein the processing circuitry is further configured to present visual information corresponding to a type of content to be output to the one of the plurality of areas.

21. The information processing device according to claim 20, wherein the processing circuitry is further configured to project a different pattern for each area of the plurality of areas in accordance with the type of content to be output to a corresponding area.

22. The information processing device according to claim 21, wherein, in a case where there is a plurality of attributes estimated for the first person, the processing circuitry is further configured to set content common to at least a subset of the plurality of attributes, and output the content through wave field synthesis in an area of the plurality of areas in which the first person is located.

23. The information processing device according to claim 20, wherein the processing circuitry is further configured to emit light to change a color of each area of the plurality of areas in accordance with the type of content to be output to a corresponding area.

24. An information processing method, comprising:
estimating, with processing circuitry, a first attribute of a first person located in at least one of a plurality of areas;
measuring, with the processing circuitry, a first location or a movement of the first person;
estimating, with the processing circuitry, a second location of the first person after a predetermined time based on the first location or the movement of the first person;
setting, with the processing circuitry, a first content corresponding to the first attribute of the first person;
outputting a first sound through wave field synthesis so that a first sound field of the first content is spatially transmitted to the second location of the first person after the predetermined time via a plurality of speakers;
estimating a second attribute of a second person in another area of the plurality of areas and setting a second content corresponding to the second attribute of the second person;
outputting a second sound through wave field synthesis so that a second sound field of the second content is spatially transmitted to the another area via the plurality of speakers; and
when the first person and the second person are in a same area of the plurality of areas, prioritizing transmission of one of the first content and the second content to the same area and outputting one sound of the first sound and the second sound according to a predetermined order of priority of the first content and the second content so that a sound field of the one of the first content and the second content is spatially transmitted to the same area,
wherein a first virtual position of a first virtual sound source of the first sound is set based on a location of the first person and the movement of the first person and a second virtual position of a second virtual sound source of the second sound is set based on a location of the second person.

25. A non-transitory computer-readable medium encoded with computer-readable instructions that, when executed by a computer, cause the computer to perform a method comprising:
estimating a first attribute of a first person located in at least one of a plurality of areas;
measuring a first location or a movement of the first person;
estimating a second location of the first person after a predetermined time based on the first location or the movement of the first person;
setting a first content corresponding to the first attribute of the first person;
outputting a first sound through wave field synthesis so that a first sound field of the first content is spatially transmitted to the second location of the first person after the predetermined time via a plurality of speakers;
estimating a second attribute of a second person in another area of the plurality of areas and setting a second content corresponding to the second attribute of the second person;
outputting a second sound through wave field synthesis so that a second sound field of the second content is spatially transmitted to the another area via the plurality of speakers; and
when the first person and the second person are in a same area of the plurality of areas, prioritizing transmission of one of the first content and the second content to the same area and outputting one sound of the first sound and the second sound according to a predetermined order of priority of the first content and the second content so that a sound field of the one of the first content and the second content is spatially transmitted to the same area,
wherein a first virtual position of a first virtual sound source of the first sound is set based on a location of the first person and the movement of the first person and a second virtual position of a second virtual sound source of the second sound is set based on a location of the second person.

26. An information processing system, comprising:
processing circuitry configured to:
estimate a first attribute of a first person located in at least one of a plurality of areas,
measure a first location or a movement of the first person,
estimate a second location of the first person after a predetermined time based on the first location or the movement of the first person,
set a first content corresponding to the first attribute of the first person,
output a first sound through wave field synthesis so that a first sound field of the first content is spatially transmitted to the second location of the first person after the predetermined time via a plurality of speakers,
estimate a second attribute of a second person in another area of the plurality of areas and set a second content corresponding to the second attribute of the second person,
output a second sound through wave field synthesis so that a second sound field of the second content is spatially transmitted to the another area via the plurality of speakers, and when the first person and the second person are in a same area of the plurality of areas, prioritize transmission of one of the first content and the second content to the same area and output one sound of the first sound and the second sound according to a predetermined order of priority of the first content and the second content so that a sound field of the one of the first content and the second content is spatially transmitted to the same area, wherein a first virtual position of a first virtual sound source of the first sound is set based on a location of the first person and the movement of the first person and a second virtual position of a second virtual sound source of the second sound is set based on a location of the second person.

\* \* \* \* \*